(12) United States Patent
Abe

(10) Patent No.: US 10,718,715 B2
(45) Date of Patent: Jul. 21, 2020

(54) MICROSCOPY SYSTEM, MICROSCOPY METHOD, AND COMPUTER-READABLE STORAGE MEDIUM

(71) Applicant: OLYMPUS CORPORATION, Tokyo (JP)

(72) Inventor: Yoko Abe, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 128 days.

(21) Appl. No.: 16/133,766

(22) Filed: Sep. 18, 2018

(65) Prior Publication Data

US 2019/0025213 A1 Jan. 24, 2019

Related U.S. Application Data

(63) Continuation of application No. PCT/JP2016/059761, filed on Mar. 25, 2016.

(51) Int. Cl.
*G01N 21/64* (2006.01)
*G02B 21/36* (2006.01)
*G02B 21/00* (2006.01)

(52) U.S. Cl.
CPC ....... *G01N 21/6458* (2013.01); *G02B 21/367* (2013.01); *G02B 21/0076* (2013.01)

(58) Field of Classification Search
None
See application file for complete search history.

(56) References Cited

U.S. PATENT DOCUMENTS 6,689,998 B1 * 2/2004 Bremer ............... G02B 7/28
235/462.23
8,743,195 B2 6/2014 Najmabadi et al.
(Continued)

FOREIGN PATENT DOCUMENTS

JP 2000-180361 A 6/2000
JP 2005-284136 A 10/2005
(Continued)

OTHER PUBLICATIONS

International Search Report dated Jun. 14, 2016 issued in PCT/JP2016/059761.

*Primary Examiner* — Talha M Nawaz
(74) *Attorney, Agent, or Firm* — Scully, Scott, Murphy & Presser, P.C.

(57) ABSTRACT

A disclosed microscopy method includes: setting a first capturing condition for previous capturing to generate a previous image for generating a primary image based on a subject, the previous capturing being sweep capturing that is capturing while changing a focal plane position with respect to the subject, such that brightness saturation does not occur in the previous image; causing an imaging apparatus to capture the previous image in accordance with the first capturing condition for the previous capturing set at the setting; setting a second capturing condition for primary capturing to generate the primary image on the basis of the previous image captured through the previous capturing by the imaging apparatus, the primary capturing being the sweep capturing; and causing the imaging apparatus to capture the primary image in accordance with the second capturing condition that has been set in the setting the second capturing condition.

9 Claims, 20 Drawing Sheets

(56) References Cited

U.S. PATENT DOCUMENTS

| | | |
|---|---|---|
| 8,767,092 B2 | 7/2014 | Kawamura |
| 8,994,809 B2 | 3/2015 | Liu et al. |
| 9,523,844 B2 | 12/2016 | Najmabadi et al. |
| 2005/0212952 A1* | 9/2005 | Triteyaprasert .... H04N 5/23212 348/345 |
| 2017/0161877 A1* | 6/2017 | Naruse .................. G06T 5/002 |
| 2018/0205855 A1* | 7/2018 | Amano ................ H04N 5/232 |

FOREIGN PATENT DOCUMENTS

| | | |
|---|---|---|
| JP | 2012-013804 A | 1/2012 |
| JP | 2014-021487 A | 2/2014 |
| JP | 2014-142657 A | 8/2014 |
| WO | WO 2012/105222 A1 | 8/2012 |

\* cited by examiner

| REAGENT | EXCITATION WAVELENGTH [nm] | FLUORESCENCE WAVELENGTH [nm] | CUBE |
|---|---|---|---|
| FITC | 490 | 520 | IB |
| Cy5 | 650 | 667 | IY |
| Alexa 405 | 405 | 420 | WU |
| . | . | . | . |
| . | . | . | . |
| . | . | . | . |

| REAGENT | EXPOSURE COEFFICIENT $P\alpha$ |
|---|---|
| FITC | 1.00 |
| Cy5 | 1.95 |
| Alexa 405 | 3.30 |
| . | . |
| . | . |
| . | . |

Count: 1920000   Min: 0
Mean: 4.227      Max: 54
StdDev: 5.757

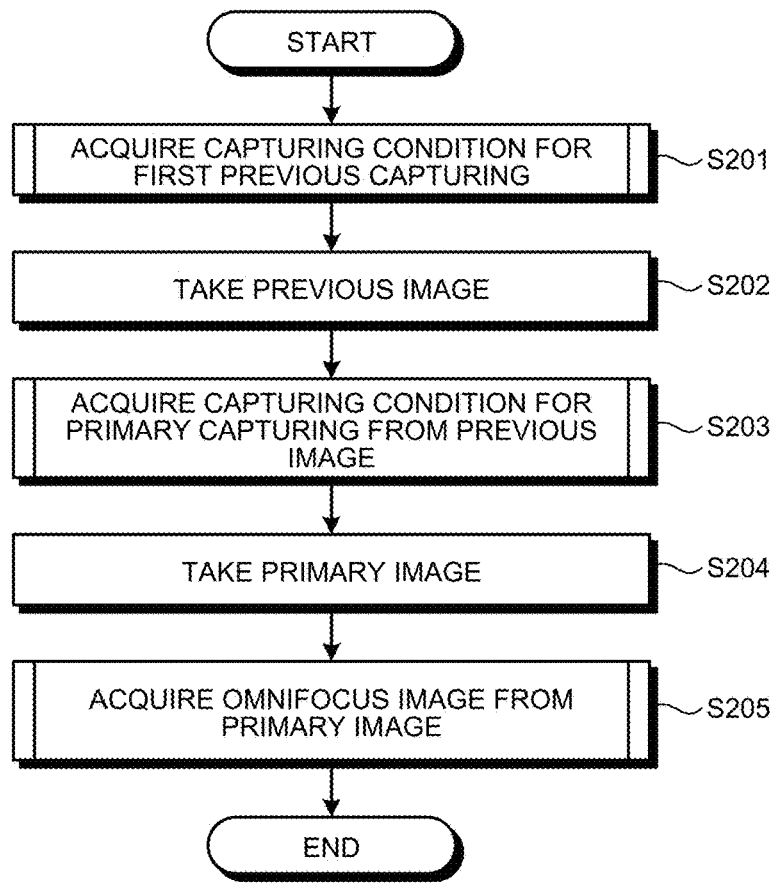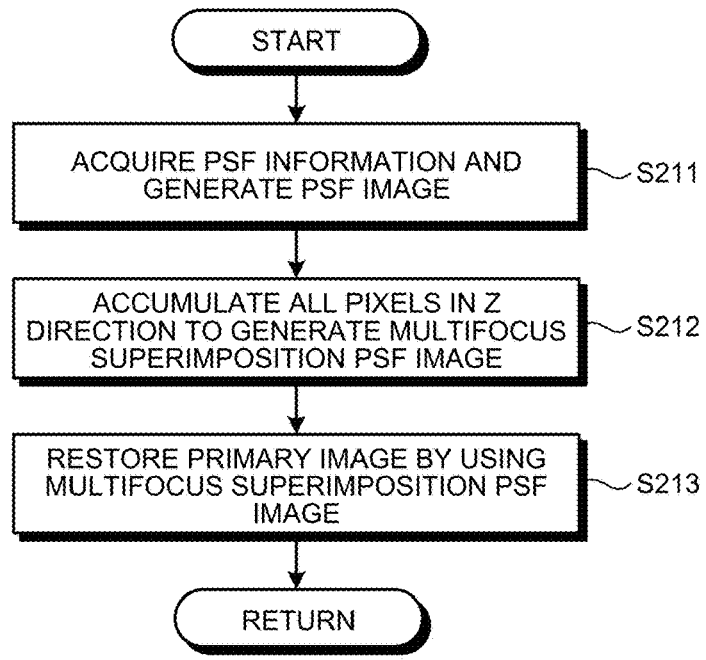

Count: 1920000  Min: 0
Mean: 4.227    Max: 54
StdDev: 5.757

MICROSCOPY SYSTEM, MICROSCOPY METHOD, AND COMPUTER-READABLE STORAGE MEDIUM

CROSS-REFERENCE TO RELATED APPLICATION

This application is a continuation of International Application No. PCT/JP2016/059761, filed on Mar. 25, 2016, the entire contents of which are incorporated herein by reference.

BACKGROUND

The present disclosure relates to a microscopy system, a microscopy method, and a non-transitory computer readable storage medium storing a microscopy program for observing a subject through images acquired by a microscope device.

For observation of a subject having depth, such as cell nuclei or stem cells, by using a biological microscope having a focal depth of several tens of µm level, users need to promptly identify the site of interest that is present in a depth direction (Z direction) along the optical axis of a microscopy optical system. To meet the users' need, there is a method with which capturing is sequentially conducted while shifting a focal plane of the microscopy optical system along the optical axis to acquire and observe images with different focal planes. Such images acquired with different focal planes are also collectively referred to as Z-stack images.

Capturing Z-stack images is time-consuming because multiple images need to be acquired. Furthermore, for fluorescence observation, when the subject is continuously irradiated with excitation light, "discoloration" which is a reduction in the intensity of fluorescence occurs; therefore, it is preferable to conduct desired capturing in as short period of time as possible and as few times as possible. Furthermore, as the exposure time for fluorescence observation is often longer than that for bright-field observation, the time during which the subject is irradiated with excitation light is inevitably long when Z-stack images are acquired.

Therefore, as the technology for acquiring images with different focal planes, sweep capturing is known which is capturing by moving the subject or the imaging device in the Z direction during exposure (for example, see International Publication WO2012/105222 and Japanese Laid-open Patent Publication No. 2012-013804). On sweep images, a structure that is present in the Z direction is superimposed, and therefore users are allowed to know the presence of a structure with depth on a two-dimensional plane perpendicular to the Z direction on the basis of sweep images. Furthermore, omnifocal images may be acquired by performing restoring processing on sweep images; thus, as compared with a method for acquiring omnifocal images from Z-stack images, a capturing time may be shortened. Furthermore, Japanese Laid-open Patent Publication No. 2012-013804 discloses the configuration in which the sweep capturing is applied to microscopes.

SUMMARY

The present disclosure has been made in view of the above, and is directed to an improvement to a microscopy system, a microscopy method, and a non-transitory computer readable storage medium storing a microscopy program for observing a subject through images acquired by a microscope device.

According to a first aspect of the present disclosure, a microscopy system is provided which includes an imaging apparatus that captures an image of a subject through a microscopy optical system of a microscope and generates a subject image; and a processor comprising hardware, the processor being configured to set a capturing condition of the imaging apparatus, and control the imaging apparatus based on the capturing condition, thereby to cause the imaging apparatus to capture an image of the subject; wherein the processor is further configured to set a first capturing condition for first previous capturing to capture a previous image for generating a primary image of the subject, as the capturing condition of the imaging apparatus, the first previous capturing being sweep capturing that is capturing while changing a position of a focal plane with respect to the subject, such that brightness saturation does not occur in the previous image obtained during the sweep capturing, and capture the primary image based on the previous image, wherein the processor is further configured to set a second capturing condition for primary capturing to acquire the primary image, as the capturing condition of the imaging apparatus, the primary capturing being sweep capturing that is capturing while changing a position of a focal plane with respect to the subject, based on the previous image captured during the first previous capturing, and cause the imaging apparatus to capture the image of the subject in accordance with the second capturing condition for the primary capturing.

According to a second aspect of the present disclosure, a microscopy method is provided which includes setting a first capturing condition for previous capturing to generate a previous image for generating a primary image based on a subject, the previous capturing being sweep capturing that is capturing while changing a position of a focal plane with respect to the subject, such that brightness saturation does not occur in the previous image obtained during the sweep capturing; causing an imaging apparatus to capture the previous image in accordance with the first capturing condition for the previous capturing set at the setting; setting a second capturing condition for primary capturing to generate the primary image on the basis of the previous image captured through the previous capturing by the imaging apparatus, the primary capturing being sweep capturing that is capturing while changing the position of the focal plane with respect to the subject; and causing the imaging apparatus to capture the primary image in accordance with the second capturing condition that has been set in the setting the second capturing condition.

According to a third aspect of the present disclosure, there is provided a non-transitory computer readable storage medium storing a microscopy program causing a computer to execute: setting a first capturing condition for previous capturing to generate a previous image for generating a primary image based on a subject, the previous capturing being sweep capturing that is capturing while changing a position of a focal plane with respect to the subject, such that brightness saturation does not occur in the previous image obtained during the sweep capturing; causing an imaging apparatus to capture the previous image in accordance with the first capturing condition for the previous capturing set at the setting; setting a second capturing condition for primary capturing to generate the primary image on the basis of the previous image captured through the previous capturing by the imaging apparatus, the primary capturing being sweep capturing that is capturing while changing the position of the focal plane with respect to the subject; and causing the imaging apparatus to capture the primary image in accordance with the second capturing condition that has been set in the setting the second capturing condition.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 14 is a flowchart that illustrates operation of the microscopy system illustrated in FIG. 13;

FIG. 15 is a flowchart that illustrates the omnifocal-image acquisition process illustrated in FIG. 14;

DETAILED DESCRIPTION OF THE PREFERRED EMBODIMENTS

Figure 1:
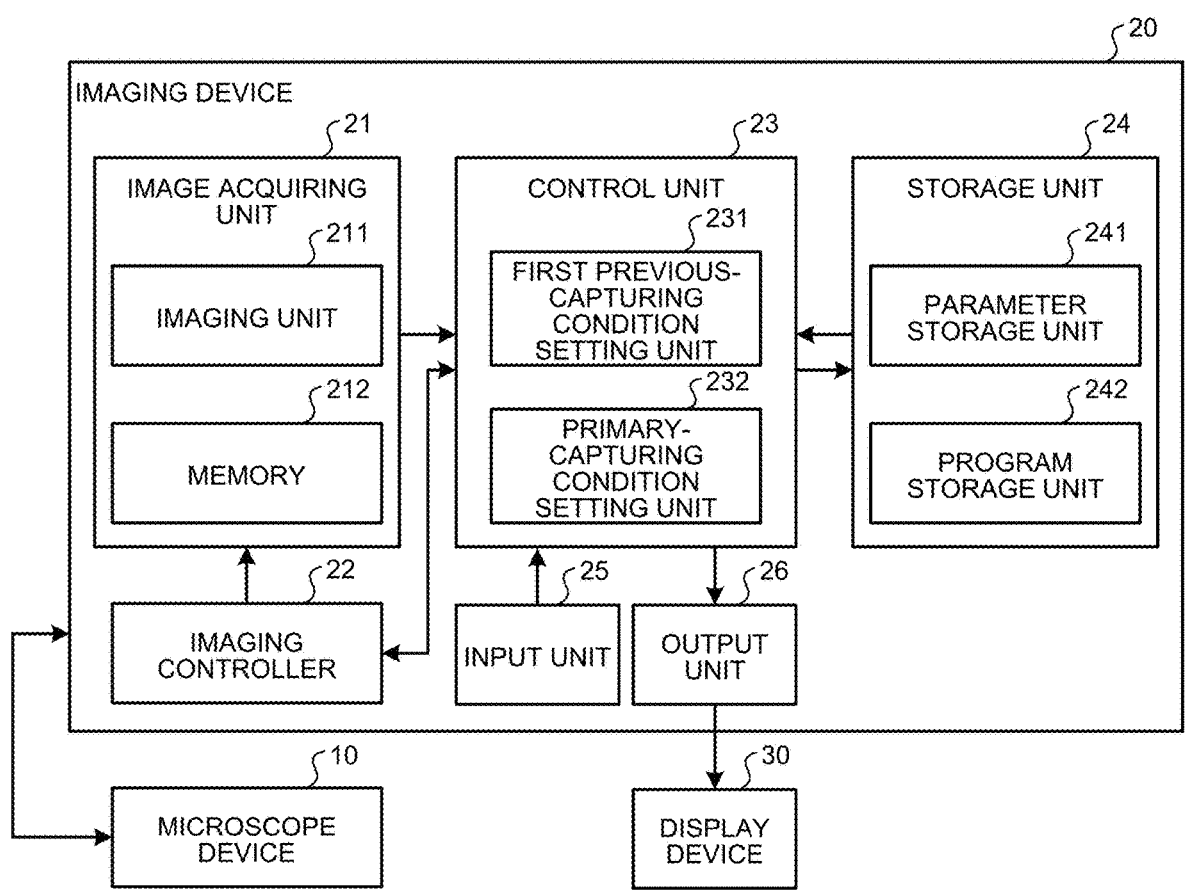
FIG. 1 is a block diagram that illustrates an example of the configuration of a microscopy system according to a first embodiment of the present disclosure.

With reference to the accompanying drawings, a detailed explanation is given below of embodiments of a microscopy system, a microscopy method, and a microscopy program according to the present disclosure. Furthermore, the present disclosure is not limited to the embodiments. Moreover, in description of each drawing, the same components are attached with the same reference numeral.

First Embodiment

FIG. 1 is a block diagram that illustrates an example of the configuration of a microscopy system according to a first embodiment of the present disclosure. As illustrated in FIG. 1, a microscopy system 1 according to the first embodiment includes a microscope device 10 that generates a subject image; an imaging device 20 that acquires and processes images of the subject image generated by the microscope device 10; and a display device 30 that displays images processed by the imaging device 20. In the microscopy system 1 according to this embodiment, light emitted by the subject is received as observation light, and a subject image is acquired by using an image based on the received light. The observation light from the subject may include, for example, fluorescence emitted by a cell as a subject which a fluorescence producing gene is introduced into and then excited by emitting excitation light to the cell, or light emitted through reaction of photoprotein with a reagent or the like. In addition to the fluorescence and the light described above, any light from a subject may be used, even if the light has a relatively low light intensity, such as light from a dark area of the subject, as long as the light allows a subject image to be acquired. In the present embodiment, an explanation is given below, taking fluorescence observation for observing fluorescence from the subject as an example.

Figure 2:
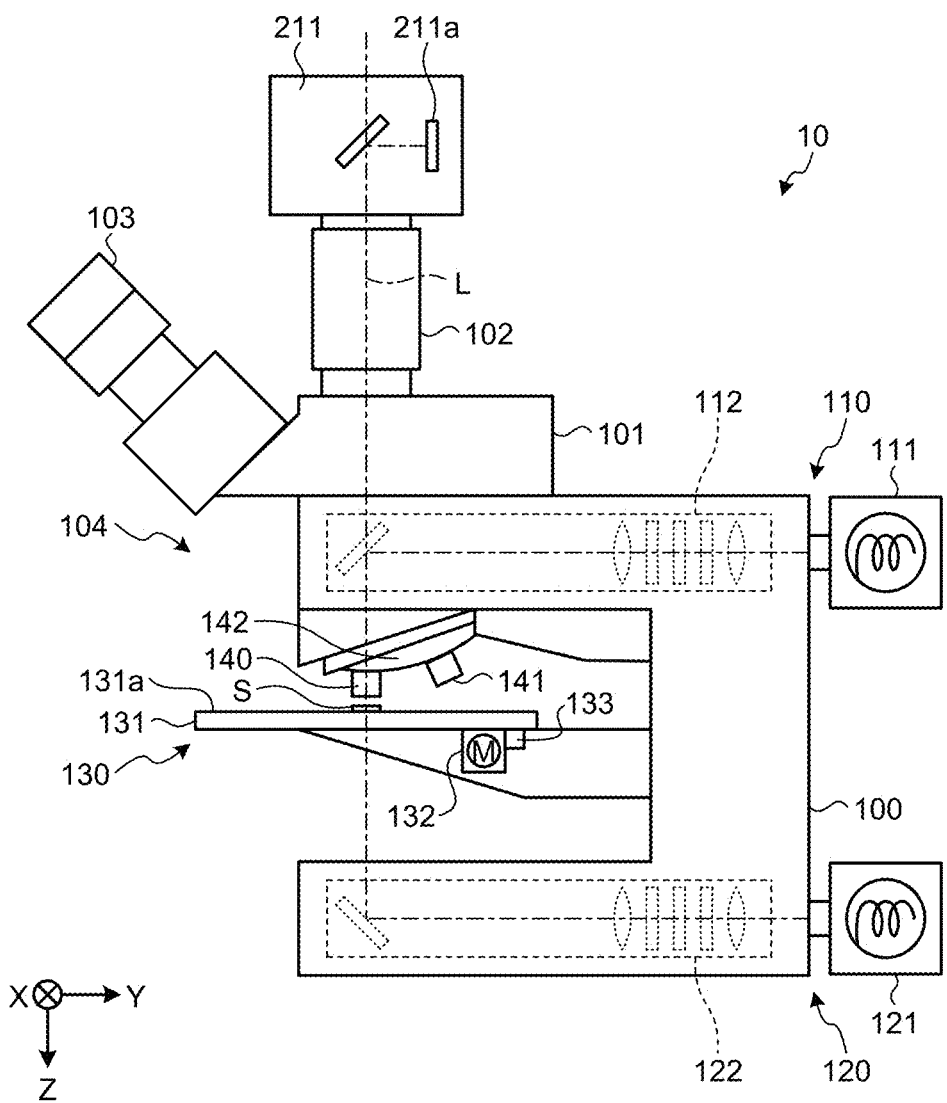
FIG. 2 is a schematic diagram that illustrates an example of the configuration of the microscope device illustrated in FIG. 1.

FIG. 2 is a schematic diagram that illustrates an example of the configuration of the microscope device 10. As illustrated in FIG. 2, the microscope device 10 includes an arm 100 having a substantially C shape; a lens tube 102 and an eyepiece unit 103 that are supported by the arm 100 through a trinocular lens unit 101; an epi-illumination unit 110 and a transmitted-light illumination unit 120 provided on the arm 100; an electric stage unit 130 including a stage 131 on which a subject S is placed; and an objective lens 140 that is provided on one end side of the lens tube 102 with the trinocular lens unit 101 interposed therebetween, so as to oppose the stage 131 and that focuses observation light from the subject S. The objective lens 140, the lens tube 102 connected with the trinocular lens unit 101 interposed therebetween, and an imaging unit 211 (described later) provided on the other end side of the lens tube 102 constitute a microscopy optical system (optical capturing system) 104.

The trinocular lens unit 101 separates observation light entering from the objective lens 140 toward the eyepiece unit 103 for a user to directly observe the subject S and toward the imaging unit 211 described later.

The epi-illumination unit 110 includes an epi-illumination light source 111 and an epi-illumination optical system 112, and emits epi-illumination light to the subject S. The epi-illumination optical system 112 includes various optical members for focusing illumination light output from the epi-illumination light source 111 and guiding the light in the direction of an optical axis L of the microscopy optical system 104. Specifically, the epi-illumination optical system 112 includes a cube having a filter that reflects light at an excitation wavelength of fluorescence and that passes fluorescence occurring by being excited due to light at the excitation wavelength, a shutter, a field stop, an aperture diaphragm, or the like.

The transmitted-light illumination unit 120 includes a transmitted-light illumination light source 121 and a transmitted-light illumination optical system 122, and emits transmitted-light illumination light to the subject S. The transmitted-light illumination optical system 122 includes various optical members for focusing illumination light output from the transmitted-light illumination light source 121 and guiding the light in the direction of the optical axis L. Specifically, the transmitted-light illumination optical system 122 includes a filter unit, a shutter, a field stop, an aperture diaphragm, or the like.

The epi-illumination unit 110 and the transmitted-light illumination unit 120 are selected for use in accordance with a microscopy technique. Furthermore, only either one of the epi-illumination unit 110 and the transmitted-light illumination unit 120 may be provided in the microscope device 10.

The electric stage unit 130 includes the stage 131; a stage drive unit 132 that moves the stage 131; and a position detecting unit 133. The stage drive unit 132 is configured by using, for example, a motor. A subject placement surface 131a of the stage 131 is provided so as to be perpendicular to the optical axis of the objective lens 140. Hereinafter, the subject placement surface 131a is an XY plane, and the normal direction to the XY plane, i.e., the direction parallel to the optical axis, is the Z direction. With regard to the Z direction, a downward direction in the figure, i.e., the direction in which the stage 131 (the subject placement surface 131a) moves away from the objective lens 140, may be referred to as a plus direction.

By moving the stage 131 within the XY plane, the position of the field of view of the objective lens 140 may be moved. Furthermore, by moving the stage 131 in the Z direction, the focal plane of the objective lens 140 may be moved along the optical axis L. That is, the electric stage unit 130 is a moving unit that moves the focal plane or the position of the field of view by moving the stage 131 under the control of an imaging controller 22 described later.

In FIG. 2, the stage 131 is moved in order to move the position of the field of view, while the position of the microscopy optical system 104 including the lens tube 102 to the objective lens 140 is fixed. However, the microscopy optical system 104 may be moved, while the position of the stage 131 is fixed, on the contrary. Alternatively, the stage 131 and the microscopy optical system 104 may be moved in opposite directions to each other. That is, any configuration may be employed as long as the microscopy optical system 104 and the subject S on the stage 131 are movable relative to each other. Furthermore, it is also possible that the focal plane is moved by moving the microscopy optical system 104 in the Z direction and the position of the field of view is moved by moving the stage 131 along the XY plane.

The position detecting unit 133 is configured by using an encoder that detects the amount of rotation of the stage drive unit 132 that is for example a motor, and it detects the position of the stage 131 and outputs a detected signal. Furthermore, instead of the stage drive unit 132 and the position detecting unit 133, a pulse generating unit that generates pulses under the control of the imaging controller 22 described later and a stepping motor may be provided.

The objective lens 140 is attached to a revolver 142 that is capable of supporting multiple objective lenses (e.g., objective lenses 140, 141) having different magnifications. By rotating the revolver 142 and changing the objective lenses 140, 141 opposed to the stage 131, an imaging magnification is changeable. Here, FIG. 2 illustrates a state where the objective lens 140 is opposed to the stage 131.

With reference back to FIG. 1, the imaging device 20 includes an image acquiring unit 21, the imaging controller 22, a control unit 23, a storage unit 24, an input unit 25, and an output unit 26. The image acquiring unit 21 acquires images by capturing a subject image generated by the microscopy optical system 104 of the microscope device 10. The imaging controller 22 controls capturing operation of the image acquiring unit 21. The control unit 23 controls various operations of the imaging device 20 and processes images acquired by the image acquiring unit 21. The storage unit 24 stores various types of information such as image data or control programs on images acquired by the image acquiring unit 21. The input unit 25 inputs commands or information to the imaging device 20. The output unit 26 that outputs images based on image data stored in the storage unit 24 and other various types of information to external devices.

The image acquiring unit 21 includes the imaging unit 211 and a memory 212. The imaging unit 211 includes an imaging device (imager) 211a (FIG. 2) that is, for example, a Charge-Coupled Device (CCD) or a Complementary Metal Oxide Semiconductor (CMOS). The imaging unit 211 is configured by using a camera capable of capturing color images in which each pixel included in the imaging device 211a has a pixel level (pixel value) of each band, R (red), G (green), or B (blue). Alternatively, the imaging unit 211 may be configured by using a camera capable of capturing black-and-white images where a luminance value Y is output as a pixel level (pixel value) at each pixel.

Referring to FIG. 2, the imaging unit 211 is provided on one end of the lens tube 102. The observation light propagating along the optical axis L of the microscopy optical system 104 is incident on a light receiving plane of the imaging device 211a. Then, the imaging unit 211 conducts photoelectric conversion on the observation light incident on the light receiving plane, thereby to generate image data of the subject in the field of view of the objective lens 140.

The memory 212 is a recording device such as a semiconductor memory, e.g., flash memory, a Random Access Memory (RAM), or a Read Only Memory (ROM) that may be updated and recorded. The memory 212 temporarily stores image data generated by the imaging unit 211.

Under the control of the control unit 23, the imaging controller 22 performs control so as to conduct sweep capturing while the position of the focal plane is changed with regard to the subject by outputting control signals to the microscope device 10 and moving the stage 131 during a single exposure period of the imaging unit 211, thereby to acquire sweep images including image information with respect to multiple planes in the direction of the optical axis L of the microscopy optical system 104. The imaging controller 22 performs control so as to acquire still images by conducting still image capturing at a predetermined position in the Z direction. Furthermore, under the control of the imaging controller 22, the position of the field of view may be moved by moving the stage 131 along the XY plane.

The control unit 23 is configured by using hardware such as a CPU, and reads programs stored in the storage unit 24 to control the overall operation of the imaging device 20 and the microscopy system 1 in an integrated manner on the basis of various parameters read from the storage unit 24, information input from the input unit 25, or the like. Additionally, the control unit 23 performs a process to set an acquisition condition for images acquired by the image acquiring unit 21. Furthermore, the control unit 23 performs control so as to cause the display device 30 to display images acquired by the image acquiring unit 21.

Specifically, the control unit 23 includes a first previous-capturing condition setting unit 231 that sets a capturing condition for previous capturing that is conducted by using the microscope device 10; and a primary-capturing condition setting unit 232 that sets a capturing condition for primary capturing that is conducted by using the microscope device 10. The previous capturing mentioned here is first previous capturing to acquire a previous image for generating the primary image, and is sweep capturing that is performed while the position of the focal plane is changed with respect to the subject. Furthermore, the primary capturing is capturing with a capturing condition set based on the previous image, and is sweep capturing that is performed while the position of the focal plane is changed with respect to the subject.

The storage unit 24 is configured by using a recording device such as a semiconductor memory, e.g., flash memory, RAM, or ROM, which may be updated and recorded, a hard disk that is built in or connected via a data communication terminal, a recording medium such as a magnetooptic disk (MO), a compact disk read only memory (CD-R), or a digital versatile disc-recordable (DVD-R), and a writing/reading device that writes information in the recording medium and reads information recorded in the recording medium. The storage unit 24 includes a parameter storage unit 241 that stores parameters used for calculation by the control unit 23; and a program storage unit 242 that stores various programs. Among them, as parameters for setting a capturing condition when fluorescence is captured, the parameter storage unit 241 stores a parameter such as a coefficient table or a relation table. In the coefficient table, a fluorescence reagent (hereafter, simply referred to reagent) is associated with an exposure coefficient. In the relation table, a reagent or an objective lens is associated with a cube. Furthermore, the program storage unit 242 stores a control program, an image processing program, and the like, which cause the imaging device 20 to perform a predetermined operation.

The input unit 25 is configured by using an input device such as keyboard, various buttons, or various switches, a pointing device such as mouse or touch panel, or the like. The input unit 25 inputs signals according to operations performed on these devices and outputs the signals to the control unit 23.

The output unit 26 is an external interface that outputs images based on image data acquired by the image acquiring unit 21, omnifocal images generated by the control unit 23, and other various types of information to an external device such as the display device 30 and displays the images and/or the various pieces of information in corresponding predetermined formats.

The above-described imaging device 20 may be configured by combining a general-purpose device, such as personal computer or workstation, with a general-purpose digital camera via an external interface.

The display device 30 is configured by using, for example, a liquid crystal display (LCD), an electroluminescent (EL) display, or a cathode ray tube (CRT) display, and displays images and relevant information output from the output unit 26. Furthermore, while the display device 30 is provided outside the imaging device 20 according to the first embodiment, the display device 30 may be provided inside the imaging device 20 in other embodiments.

Figure 3:
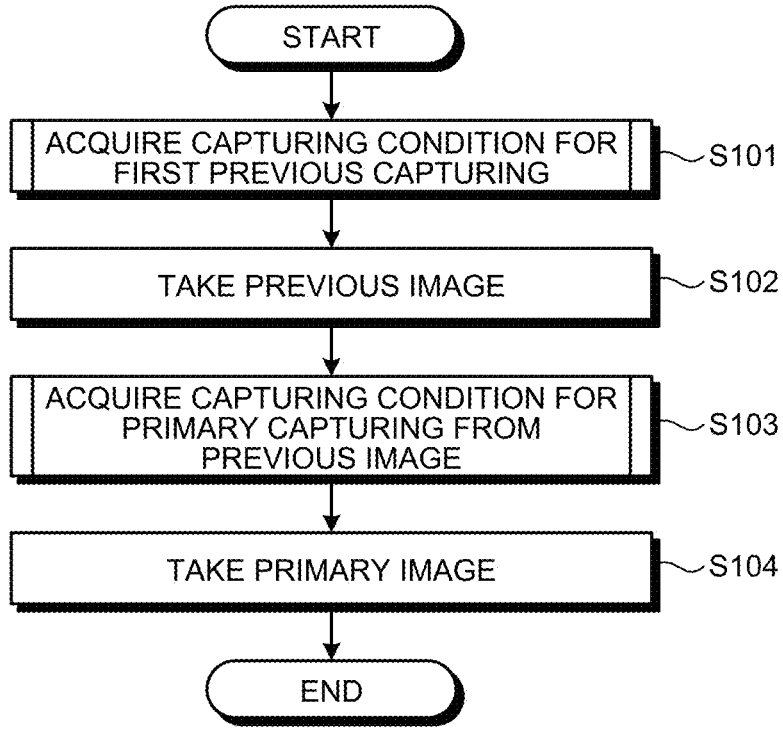
FIG. 3 is a flowchart that illustrates operation of the microscopy system illustrated in FIG. 1.

Next, operation of the microscopy system 1 is explained. FIG. 3 is a flowchart that illustrates operation of the microscopy system 1. An explanation is given based on the assumption that each unit performs the operation described below under the control of the control unit 23.

First, at Step S101, the first previous-capturing condition setting unit 231 sets a capturing condition for the first previous capturing to acquire the previous image. Specifically, based on the set information, the first previous-capturing condition setting unit 231 acquires a capturing condition for sweep capturing that is the first previous capturing to acquire the previous image.

Figure 4:
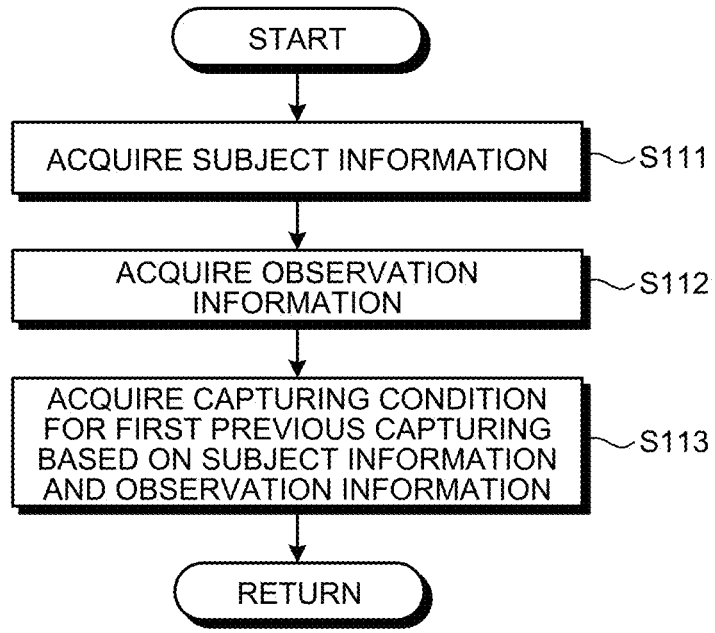
FIG. 4 is a flowchart that illustrates a process to acquire a capturing condition for the first previous capturing illustrated in FIG. 3.

FIG. 4 is a flowchart that illustrates a process to acquire a capturing condition for the first previous capturing illustrated in FIG. 3. First, the first previous-capturing condition setting unit 231 acquires subject information including the reagent used, the excitation wavelength, and the thickness of the subject in accordance with a sweep distance (Step S111).

Figures 5, 6:
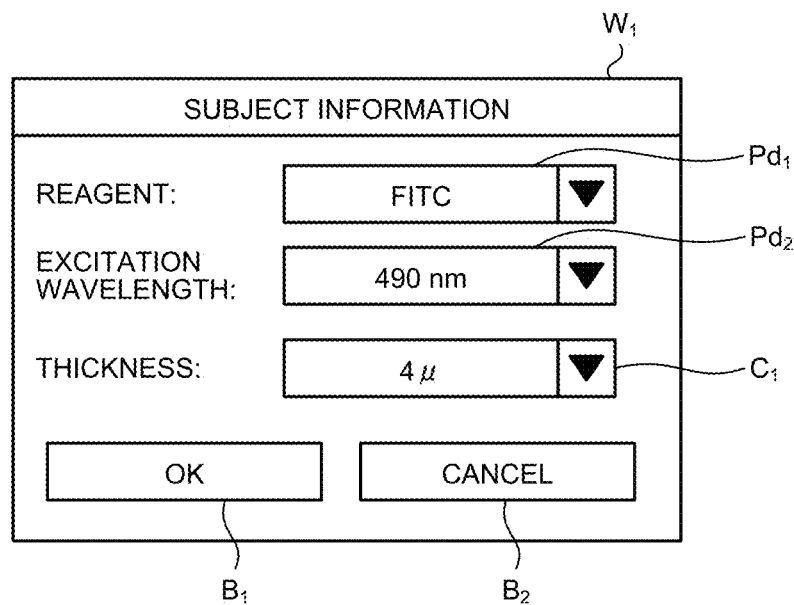
FIG. 5 is a schematic diagram that illustrates a process to set a capturing condition for the first previous capturing.
FIG. 6 is a diagram that illustrates an example of information stored in a parameter storage unit.

FIG. 5 is a schematic diagram that illustrates a process to set a capturing condition for the first previous capturing, and is a diagram that illustrates a user interface displayed on the display device 30. As illustrated in FIG. 5, a user interface may be displayed on the display device 30 so that a user inputs settings. An input screen $W_1$ illustrated in FIG. 5 displays a pull-down $Pd_1$ for setting a reagent, a pull-down $Pd_2$ for setting an excitation wavelength, an input box $C_1$ that allows an input setting for a thickness of a subject, an OK button $B_1$ for confirming inputs of the settings, and a cancel button $B_2$ for cancelling inputs of the settings. A user selects an item displayed on a pull-down through the input unit 25, makes an input to the input box $C_1$, and selects the OK button $B_1$ or the cancel button $B_2$, thereby setting subject information and confirming settings.

Furthermore, the relation between a reagent and an excitation wavelength may be previously stored in the parameter storage unit 241 so that an excitation wavelength is automatically selected when a reagent is selected. FIG. 6 is a diagram that illustrates an example of information stored in the parameter storage unit 241, and the diagram illustrates the relation table that relates a reagent, an excitation wavelength, a fluorescence wavelength, and a cube. As illustrated in FIG. 6, the relation table relating a reagent and a wavelength band of excitation light is previously stored in the parameter storage unit 241 so that when one of the reagent and the excitation wavelength is selected, the other one is automatically selected, as described above.

Figures 7, 8:
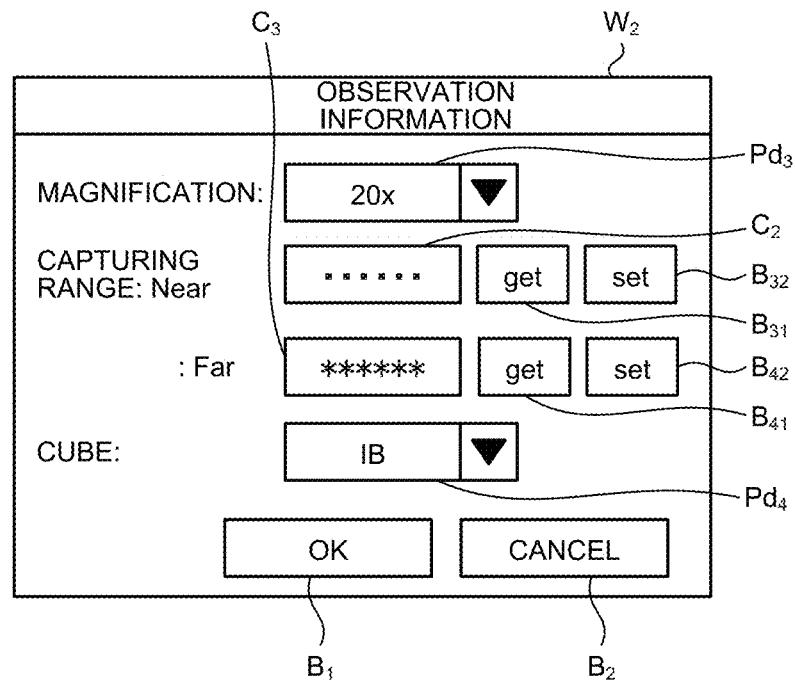
FIG. 7 is a schematic diagram that illustrates a process to set capturing conditions for the first previous capturing.
FIG. 8 is a diagram that illustrates an example of the relation between a reagent and an exposure coefficient.

At Step S112 subsequent to Step S111, the first previous-capturing condition setting unit 231 acquires observation information including the magnification of an objective lens, a capturing range, and a cube. FIG. 7 is a schematic diagram that illustrates a process to set capturing conditions for the first previous capturing, specifically, the user interface displayed on the display device 30. As illustrated in FIG. 7, the display device 30 may display the user interface that allows user input settings. An input screen $W_2$ illustrated in FIG. 7 displays a pull-down $Pd_3$ for setting the magnification of an objective lens, an input box $C_2$ that allows an input setting for a position on the closer side (near) to the subject within a capturing range, an input box $C_3$ that allows an input setting for a position on the remote side (far) from the subject within a capturing range, a pull-down $Pd_4$ for setting a cube to be used, an OK button $B_1$ for confirming the input settings, and a cancel button $B_2$ for cancelling the input settings. A user selects an item displayed on a pull-down, inputs desired settings to the input boxes $C_2$, $C_3$, and selects the OK button $B_1$ or the cancel button $B_2$ through the input unit 25 (FIG.1), thereby setting observation information and confirming the settings.

Furthermore, on the input screen $W_2$, "get" buttons $B_{31}$, $B_{41}$ are input buttons for acquiring the position of the current objective lens 140 or the stage 131, and "set" buttons $B_{32}$, $B_{42}$ are input buttons for setting the positions acquired by the "get" buttons $B_{31}$, $B_{41}$. For example, when a user moves the stage 131 to a desired position and then presses the "get" button $B_{31}$ through the input unit 25, the position of the current stage 131 is acquired as a near position. Then, when the set button $B_{32}$ is pressed through the input unit 25, the acquired position of the stage 131 is set as a near position.

After subject information and observation information are acquired at Step S111 and S112, the first previous-capturing condition setting unit 231 acquires a capturing condition for the first previous capturing based on the subject information and the observation information (Step S113). The first previous-capturing condition setting unit 231 first acquires an exposure coefficient Pα that is determined based on a reagent from the subject information and then acquires an exposure time Pex that is calculated by multiplying a reference exposure time Bex by the acquired exposure coefficient Pα.

Here, the exposure coefficient Pα is explained. Luminance I, a molar absorption coefficient ($\varepsilon(M^{-1}\ cm^{-1})$), and a quantum yield ($\phi$) are in a relation of $I \propto \varepsilon \times \phi$. M (molar) is a unit that represents a molar number of solute in a unit volume of solution (mol/L=$10^{-3}$M). The quantum yield ($\phi$) is the number of photons emitted/the number of photons absorbed, and is measurable by using a peak wavelength in the absorption spectrum for each fluorochrome.

It is known that the luminance I is proportional to an amount of light at a specific wavelength absorbed by a fluorescent substance and a conversion efficiency (quantum yield) between excitation light and fluorescence. The luminance I may be calculated (measured or recorded) depending on the type of reagent. For example, as for fluorescein (FITC), $\varepsilon$=70,000, and $\phi$=0.9, and as for Cy5, $\varepsilon$=200,000, and $\phi$=0.3. With regard to luminance information obtained based on a reagent as described above, for example, the luminance of extremely light FITC is used as a reference luminance, and a luminance ratio is obtained with respect to FITC, whereby the exposure coefficient of each reagent may be determined. For example, when the luminance of FITC that has the highest luminance among the reagents used is set as the reference luminance and the exposure time of FITC is set as the reference exposure time Bex, the exposure time Pex may be calculated based on Equation (1) below.

$$Pex = Bex \times P\alpha \quad (1)$$

Here, Pα is the reference luminance/the reagent luminance.

Furthermore, the above-described exposure time Pex may be calculated in consideration of discoloration of a reagent. In this case, when the exposure time for observing FITC before discoloration is Fex (e.g., 0.1 ms=100 ns), the reference exposure time Bex is Fex×k (≤1.0). k is a compensation coefficient for setting an exposure time such that it is ensured that saturation does not occur, and is a coefficient settable in accordance with a degree of discoloration of a reagent. By using the exposure coefficient Pα, it is possible to set a short exposure time that corresponds to a reagent, and it is possible to prevent brightness saturation of previous images.

Furthermore, if a user has set the reagent used, the parameter storage unit 241 may previously store a relation table as a coefficient table in which a reagent and an exposure coefficient are associated with each other. When a reagent is specified, an exposure coefficient may be acquired from the coefficient table. FIG. 8 is a diagram that illustrates an example of the relation between a reagent and an exposure coefficient. As illustrated in FIG. 8, a reagent and an exposure coefficient are stored in relation to each other so that an exposure coefficient may be acquired when a reagent is set.

Then, the first previous-capturing condition setting unit 231 acquires a capturing range $D_1$ ($D_1$=near-far) in the observation information and calculates a moving velocity Sp (Sp=$D_1$/Pex) in the Z direction on the basis of the calculated exposure time Pex and the acquired capturing range. The first previous-capturing condition setting unit 231 sets a capturing condition on the basis of the exposure coefficient Pα that is determined based on the reagent and the previously set reference exposure time Bex, thereby setting a capturing condition that may suppress brightness saturation of the previous image acquired during the first previous capturing.

In the above explanation, an exposure time is calculated by using an exposure coefficient; however, it is also possible that an excitation intensity coefficient or a diaphragm coefficient is used as a reference and a relation table of an excitation intensity coefficient or a diaphragm coefficient is used so that a set value is calculated by correcting each reference (reference excitation intensity or reference diaphragm value) with each coefficient. Then, the first previous-capturing condition setting unit 231 calculates the exposure time Pex from the set value, acquires the capturing range $D_1$ from the observation information, and calculates the moving velocity Sp based on the distance and the exposure time Pex. Furthermore, for observation of a self-emitting subject such as photoprotein in addition to fluorescence, an exposure time is set in accordance with the type, or the like, of photoprotein.

After the first previous-capturing condition setting unit 231 calculates the exposure time Pex and the moving velocity Sp that are capturing conditions for the first previous capturing as described above, the control unit 23 returns to the flowchart of FIG. 3.

Figure 9:
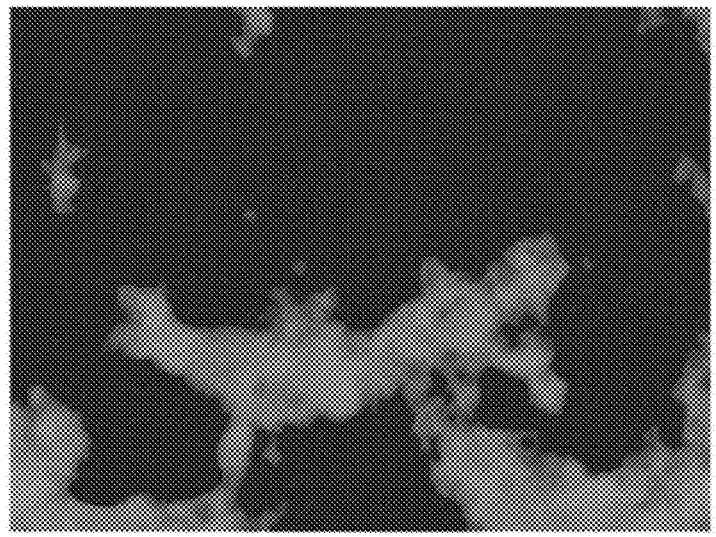
FIG. 9 illustrates an example of the previous image obtained during the first previous capturing.

With reference back to FIG. 3, the control unit 23 causes sweep capturing that is the first previous capturing to be conducted to take the previous image on the basis of the exposure time Pex and the moving velocity Sp acquired at Step S101 (Step S102). Here, the imaging controller 22 controls the imaging unit 211 so that sweep capturing is conducted in accordance with the exposure time Pex and the moving velocity Sp to acquire a subject image. The control unit 23 acquires the subject image obtained during sweep capturing as a previous image. FIG. 9 illustrates an example of the previous image obtained during the previous sweep capturing. Because such sweep capturing is conducted in accordance with the exposure time Pex and the moving velocity Sp acquired at Step S101, the previous image illustrated in FIG. 9 may be obtained.

Figure 10:
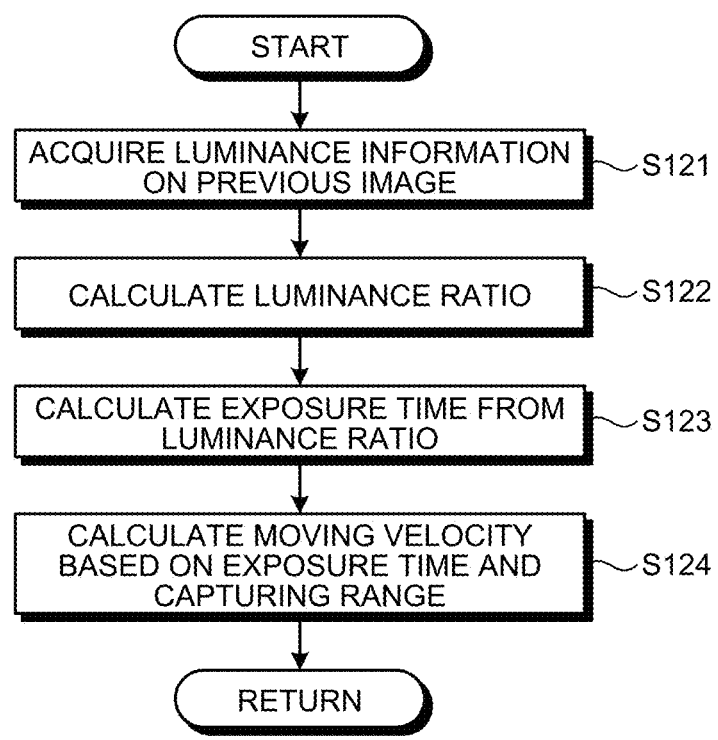
FIG. 10 is a flowchart that illustrates a process to acquire a capturing condition for the primary capturing illustrated in FIG. 3.

At Step S103 subsequent to Step S102, the control unit 23 acquires a capturing condition for the primary capturing to acquire the primary image from the previous image. FIG. 10 is a flowchart that illustrates a process to acquire a capturing condition for the primary capturing illustrated in FIG. 3. First, the primary-capturing condition setting unit 232 acquires luminance information on the previous image acquired at Step S102 (Step S121). Specifically, as luminance information on the previous image, the primary-capturing condition setting unit 232 generates a histogram with regard to the luminance values in all the pixels of the previous image.

Figure 11:
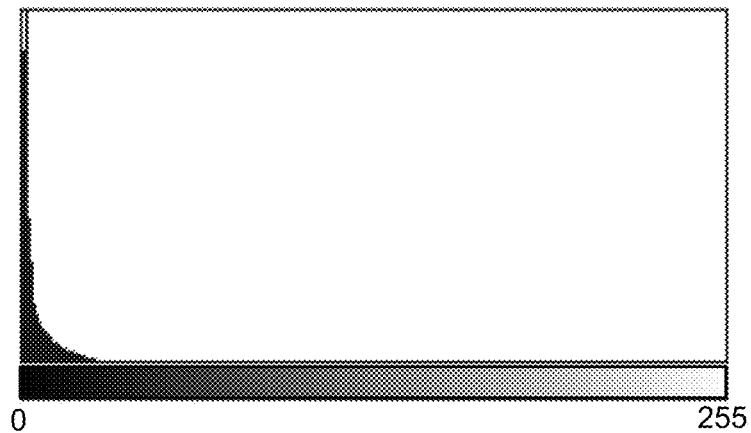
FIG. 11 is a graph that illustrates an example of the histogram generated on the basis of the previous image.

FIG. 11 is a graph that illustrates an example of the histogram generated on the basis of the previous image. As illustrated in FIG. 11, the minimum luminance value (Min), the maximum luminance value (Max), and the mean (Mean) may be acquired from the histogram generated based on the luminance values of the previous image.

Then, the primary-capturing condition setting unit 232 acquires the maximum luminance from the generated histogram and calculates the luminance ratio between the reference maximum luminance (e.g., the luminance value: 255) and the maximum luminance (e.g., the maximum luminance value: 54 in the histogram illustrated in FIG. 11) in the previous image (Step S122). When the luminance ratio is Eg, the primary-capturing condition setting unit 232 calculates the luminance ratio Eg by using the luminance ratio Eg=the reference maximum luminance value (e.g., 255)/the previous-image maximum luminance value (e.g., 54).

At Step S123 subsequent to Step S122, the primary-capturing condition setting unit 232 calculates an exposure time during the primary capturing from the luminance ratio Eg. Specifically, when the exposure time of the primary image capturing is Rex, the primary-capturing condition setting unit 232 calculates the exposure time Rex according to Equation (2) described below by using the exposure time Pex of the previous image and the luminance ratio Eg.

$$Rex=Pex \times Eg \qquad (2)$$

At Step S124 subsequent to Step S123, the primary-capturing condition setting unit 232 acquires the capturing range $D_1$ ($D_1$=near-far) in the observation information and calculates a moving velocity Sr (Sr=$D_1$/Rex) in the Z direction based on the calculated exposure time Rex and the acquired capturing range ($D_1$).

After the primary-capturing condition setting unit 232 calculates the exposure time Rex and the moving velocity Sr that are capturing conditions for the primary capturing as described above, the control unit 23 returns to the flowchart of FIG. 3.

Figure 12:
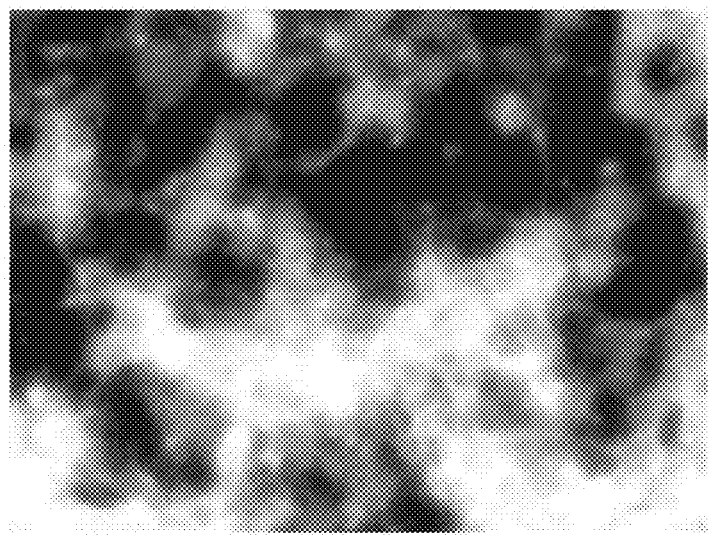
FIG. 12 illustrates an example of the primary image obtained during sweep capturing.

With reference back to FIG. 3, the control unit 23 causes sweep capturing that is the primary capturing to be conducted on the basis of the sweep range during the first previous capturing acquired at Step S101 and the exposure time Rex and the moving velocity Sr acquired at Step S103 to take the primary image (Step S104). Specifically, the imaging controller 22 controls the imaging unit 211 so that sweep capturing is conducted in accordance with the exposure time Rex and the moving velocity Sr, thereby to acquire the subject image. The control unit 23 acquires the subject image obtained during the sweep capturing as the primary image. FIG. 12 illustrates an example of the primary image obtained during the sweep capturing. Sweep capturing is conducted in accordance with the exposure time Rex and the moving velocity Sr acquired at Step S103 so that the primary image illustrated in FIG. 12 may be obtained.

Then, the control unit 23 terminates the process to acquire the image. The control unit 23 may display the acquired primary image in the display device 30, store the primary image in the storage unit 24, or display the primary image in the display device 30 and also store the primary image in the storage unit 24.

As described above, according to the first embodiment of the present disclosure, before the primary image is captured, sweep capturing is conducted as the previous capturing under the capturing condition that is set on the basis of a reagent, or the like, to acquire the previous image, and the capturing condition for sweep capturing that is the primary capturing to acquire the primary image is set on the basis of luminance values of the previous image. Therefore, sweep capturing is previously conducted only once to set the exposure time for the primary capturing, whereby the optimum exposure time may be set with a small number of times of capturing (capturing time) and the primary (sweep) image with brightness saturation suppressed may be acquired. Thus, it is possible to acquire images with which the presence of a structure with depth is recognizable on a two-dimensional plane, which is the XY plane, while there is little discoloration of fluorescence from the subject.

Furthermore, according to the above-described first embodiment, images are acquired by conducting capturing while the focal plane is moved during a single exposure period. Therefore, the images may be captured in a short time, as compared with a case where Z-stack images are acquired during multiple times of capturing and the Z-stack images are averaged to acquire a multifocal superimposition image, and the amount of data or the number of calculations for image processing may be significantly reduced.

Modification of the first embodiment

Figure 13:
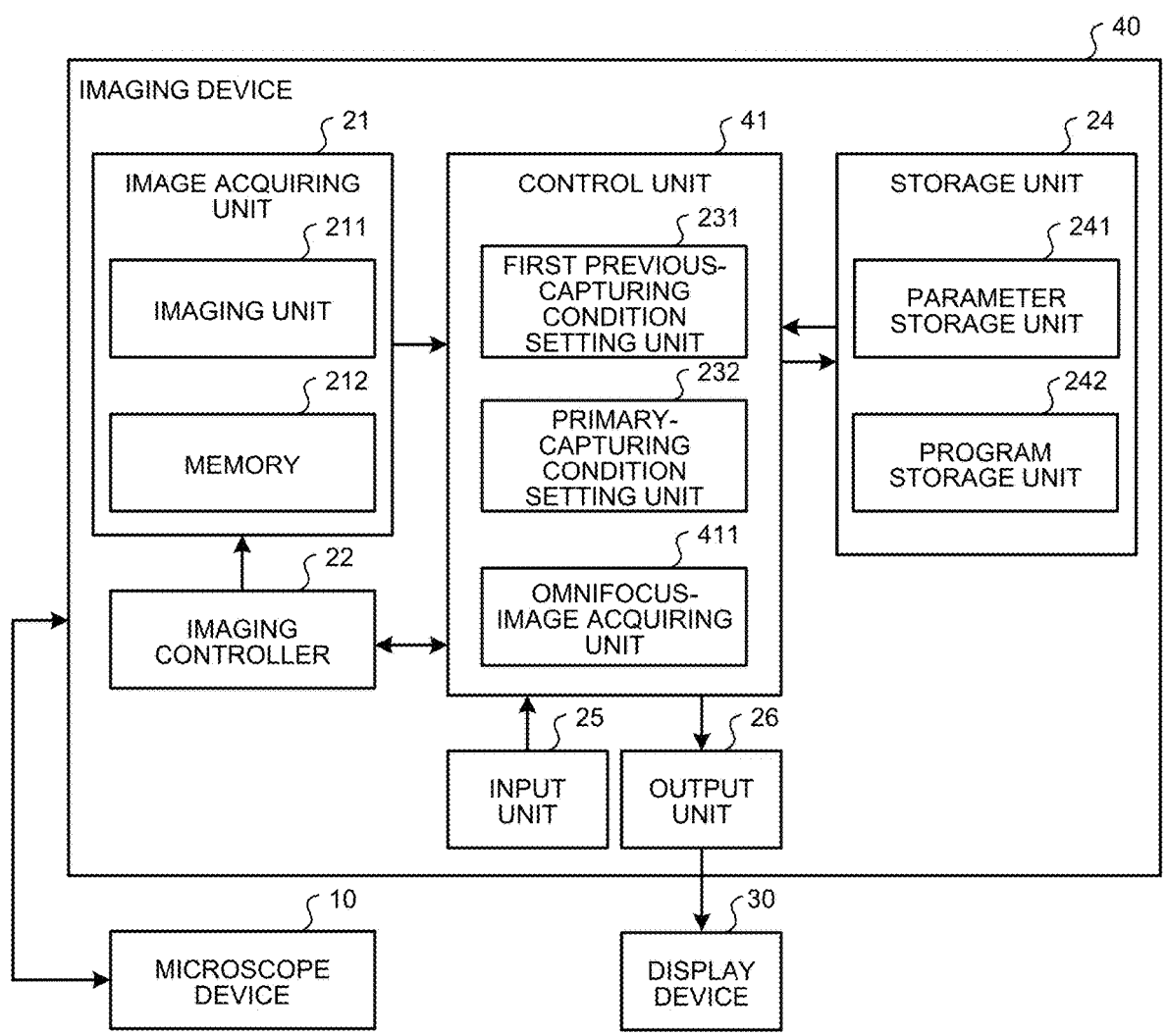
FIG. 13 is a block diagram that illustrates an example of the configuration of a microscopy system according to a modification of the first embodiment of the present disclosure.

Next, a modification of the first embodiment of the present disclosure is explained. FIG. 13 is a block diagram that illustrates an example of the configuration of a microscopy system according to the modification of the first embodiment of the present disclosure. As illustrated in FIG. 13, a microscopy system 2 according to the modification includes the microscope device 10; an imaging device 40 that acquires and processes images of the subject generated by the microscope device 10; and the display device 30 that displays images, and the like, processed by the imaging device 40. Among them, configurations and operations of the microscope device 10 and the display device 30 are the same as those in the first embodiment.

Instead of the control unit 23 illustrated in FIG. 1, the imaging device 40 includes a control unit 41. Compares with the control unit 23, the control unit 41 further includes an omnifocal image acquiring unit 411 that generates omnifocal images based on acquired primary images. Furthermore, operations of the first previous-capturing condition setting unit 231 and the primary-capturing condition setting unit 232 are the same as those in the first embodiment.

Next, operation of the microscopy system 2 is explained. FIG. 14 is a flowchart that illustrates operation of the microscopy system 2. An explanation is given based on the assumption that each unit performs the operation described below under the control of the control unit 41.

The process to set the capturing condition for the first previous capturing until the process to acquire the primary image are the same as those at Step S101 to S104 according to the above-described first embodiment (Step S201 to S204). First, at Step S201, the first previous-capturing condition setting unit 231 acquires a capturing condition for sweep capturing that is the first previous capturing. Then, the control unit 41 causes sweep capturing to be conducted in accordance with the capturing condition acquired at Step S201 to take the previous image (Step S202).

At Step S203 subsequent to Step S202, the control unit 41 acquires capturing conditions (the exposure time Rex and the moving velocity Sr) for the primary capturing from the previous image. Then, the control unit 41 causes sweep capturing that is the primary capturing to be conducted in accordance with the exposure time Rex and the moving velocity Sr acquired at Step S203 to take the primary image (Step S204).

After the primary image is acquired, the control unit 41 generates and acquires an omnifocal image from the primary image (Step S205). FIG. 15 is a flowchart that illustrates the omnifocal image acquisition process illustrated in FIG. 14. First, the omnifocal image acquiring unit 411 acquires point spread function (PSF) information (a plurality of slices) representing image blur at each Z position in the capturing range (the capturing range for sweep capturing in the Z direction) that is set in accordance with the observation information, and generates a PSF image based on the PSF information (Step S211). Here, PSF information is previously stored in the parameter storage unit 241 in association with a capturing position based on a capturing condition such as an excitation wavelength or an observation magnification. Then, with regard to the PSF images at each Z position, the omnifocal image acquiring unit 411 accumulates pixel values of pixels at a corresponding position and calculates the average value of the accumulated pixel values, thereby generating a multifocal superimposition PSF image (Step S212). In this way, the omnifocal image acquiring unit 411 acquires a multifocal superimposition PSF image as PSF information in the sweep range of the primary capturing.

Figure 16:
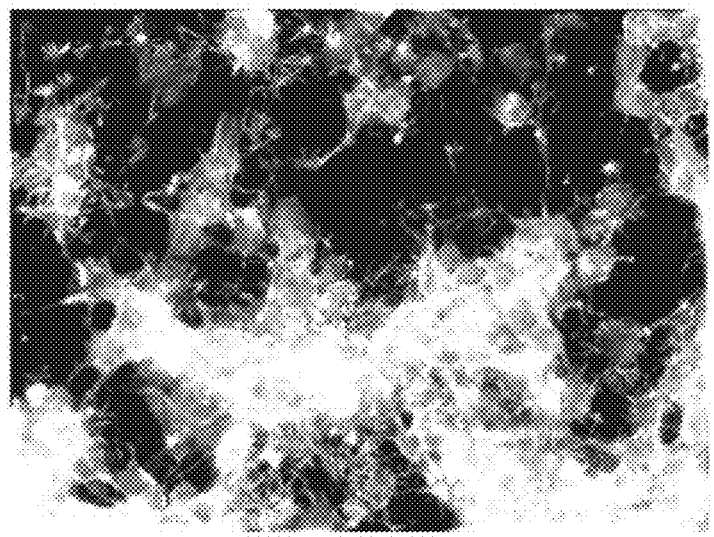
FIG. 16 illustrates an example of the omnifocal image acquired based on the primary image obtained during sweep capturing.

Then, the omnifocal image acquiring unit 411 acquires an omnifocal image based on the primary image and the multifocal superimposition PSF image (Step S213). Specifically, the omnifocal image acquiring unit 411 restores the primary image by using the multifocal superimposition PSF image to acquire an omnifocal image. Here, known restoring technologies may be used as the method of restoring images. FIG. 16 illustrates an example of the omnifocal image acquired based on the primary image obtained during sweep capturing. The primary image illustrated, for example, in FIG. 12 may be obtained by conducting sweep capturing in accordance with the exposure time Rex and the moving velocity Sr acquired at Step S203, and furthermore an omnifocal image may be generated based on the primary image and a multifocal superimposition PSF image.

Then, with reference back to FIG. 14, the control unit 41 terminates the process regarding image acquisition. The control unit 41 may display the acquired omnifocal image on the display device 30, store the omnifocal image in the storage unit 24, or display the omnifocal image on the display device 30 and also store the omnifocal image in the storage unit 24.

As described above, according to the modification of the first embodiment of the present disclosure, before the primary image is captured, sweep capturing is conducted as the previous capturing under the capturing condition that is set based on a reagent, or the like, to acquire the previous image, and the capturing condition for the primary capturing is set based on luminance values of the previous image. Therefore, sweep capturing is previously conducted only once to set the exposure time for the primary capturing so that the optimum exposure time may be set with a small number of times of capturing (capturing time) and the primary (sweep) image may be acquired. Furthermore, high-visibility omnifocal images with brightness saturation suppressed may be generated based on the primary (sweep) image and the multifocal superimposition PSF image. Thus, it is possible to acquire images with which the presence of a structure with depth is recognizable on a two-dimensional plane, which is the XY plane, while there is little discoloration of fluorescence from the subject.

Second Embodiment

Figure 17:
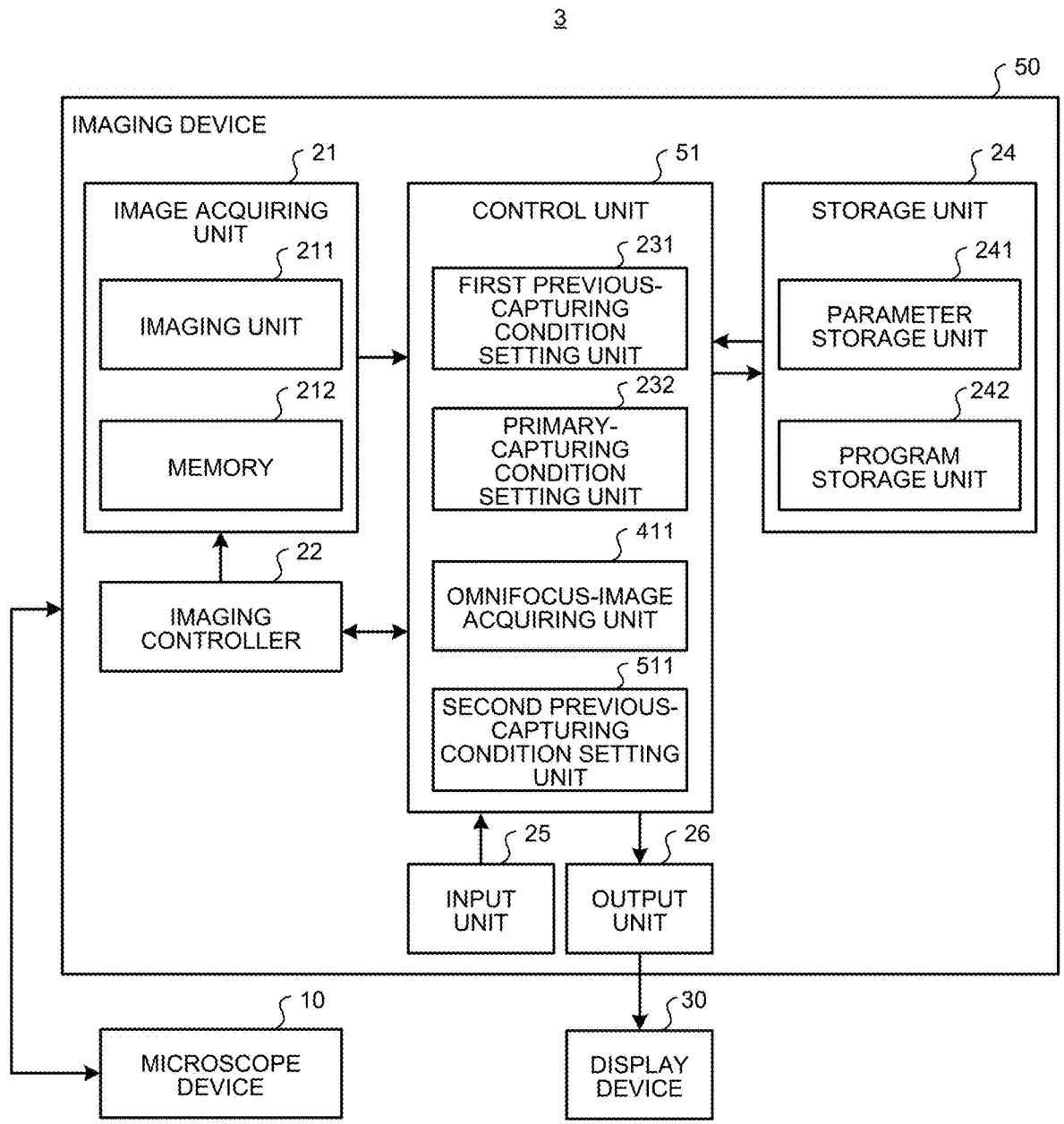
FIG. 17 is a block diagram that illustrates an example of the configuration of a microscopy system according to a second embodiment of the present disclosure.

Next, a second embodiment of the present disclosure is explained. FIG. 17 is a block diagram that illustrates an example of the configuration of a microscopy system according to the second embodiment of the present disclosure. As illustrated in FIG. 17, a microscopy system 3 according to the second embodiment includes the microscope device 10; an imaging device 50 that acquires and processes images of the subject generated by the microscope device 10; and the display device 30 that displays images, or the like, processed by the imaging device 50. Among them, configurations and operations of the microscope device 10 and the display device 30 are the same as those in the first embodiment.

Instead of the control unit 41 illustrated in FIG. 13, the imaging device 50 includes a control unit 51. As compared with the control unit 41, the control unit 51 further includes a second previous-capturing condition setting unit 511 that sets a capturing condition for second previous capturing that is conducted before the first previous capturing. Here, operations of the first previous-capturing condition setting unit 231, the primary-capturing condition setting unit 232, and the omnifocal image acquiring unit 411 are the same as those in the first embodiment and the modification. The second previous capturing according to the second embodiment is still image capturing to take a still subject image at a capturing start position or a capturing end position in the capturing range of sweep capturing that is the first previous capturing.

Figure 18:
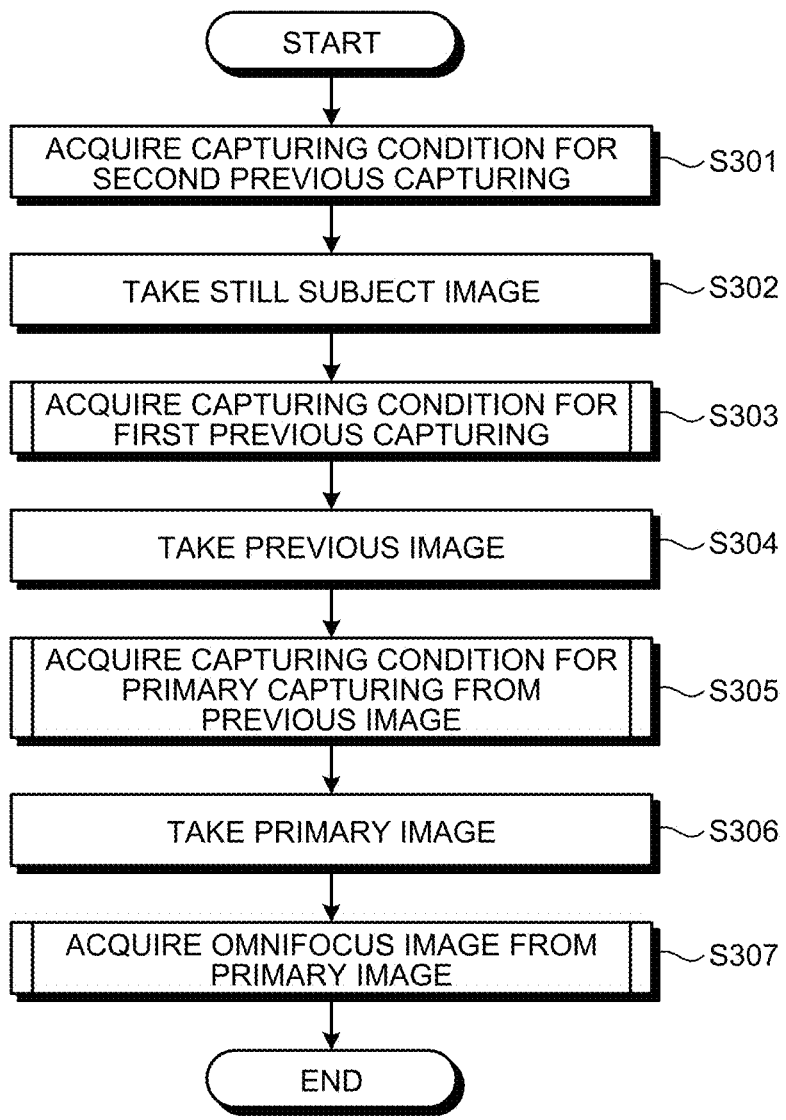
FIG. 18 is a flowchart that illustrates operation of the microscopy system illustrated in FIG. 17.

Next, operation of the microscopy system 3 is explained. FIG. 18 is a flowchart that illustrates operations of the microscopy system 3. An explanation is given based on the assumption that each unit performs the operation described below under the control of the control unit 51.

First, the second previous-capturing condition setting unit 511 acquires a capturing condition for the second previous capturing (Step S301). The second previous-capturing condition setting unit 511 sets the near position in the capturing range, which is set through the input screen, or the like, illustrated in FIG. 7, as a capturing position and acquires an exposure time Pex_n, acquired by conducting automatic exposure processing, as a capturing condition for the second previous capturing. A known technique may be used for the automatic exposure processing and, as disclosed in, for example, Japanese Patent No. 3384577, the histogram of an image captured at any exposure time is acquired, an area having a luminance lager than a threshold is set as a processing target, and the exposure time Pex_n is acquired by using the average value of the luminance at the area.

Figure 19:
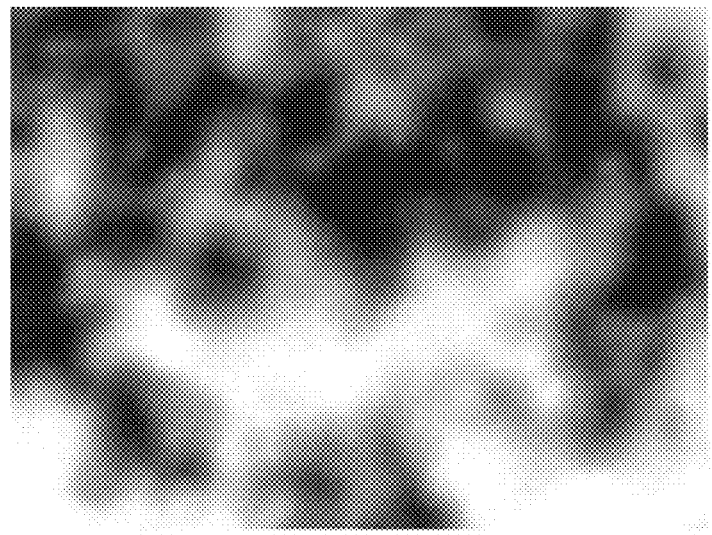
FIG. 19 illustrates an example of the second previous image obtained during the second previous capturing illustrated in FIG. 18.

Then, the control unit 51 takes still subject images in accordance with the capturing condition acquired at Step S301 (Step S302). FIG. 19 illustrates an example of the still subject image obtained during the second previous capturing illustrated in FIG. 18. By capturing the subject at the near position in accordance with the exposure time Pex_n acquired at Step S301, the still subject image illustrated in, for example, FIG. 19 may be obtained.

Figure 20:
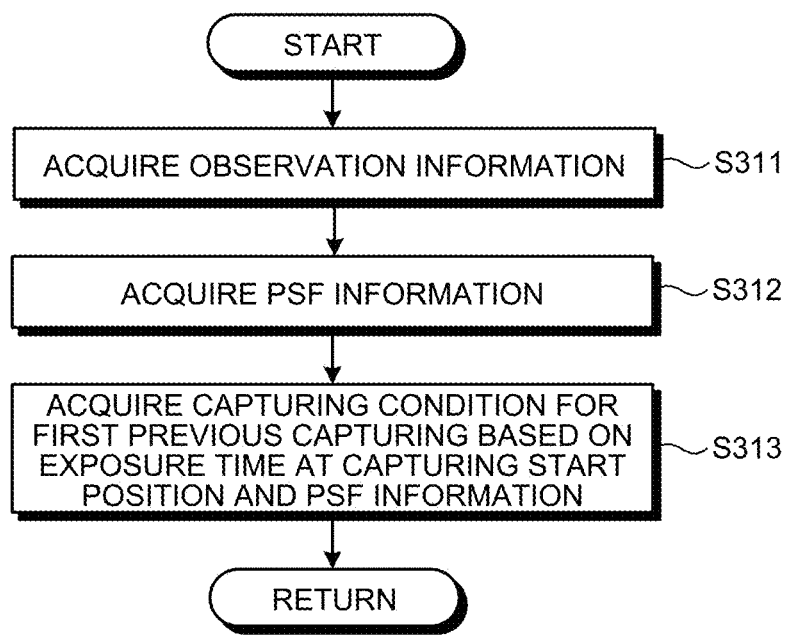
FIG. 20 is a flowchart that illustrates the process to acquire the capturing condition for the first previous capturing illustrated in FIG. 18.

At Step S303 subsequent to Step S302, the first previous-capturing condition setting unit 231 acquires a capturing condition for the first previous capturing. The first previous-capturing condition setting unit 231 acquires a capturing condition for the first previous capturing on the basis of the exposure time Pex_n acquired at Step S301. FIG. 20 is a flowchart that illustrates the process to acquire the capturing condition for the first previous capturing illustrated in FIG. 18. First, the first previous-capturing condition setting unit 231 acquires observation information including a magnification of an objective lens, a capturing range, and a cube (Step S311). For example, the observation information set by using the user interface illustrated in FIG. 7 is acquired.

After the observation information is acquired at Step S311, the first previous-capturing condition setting unit 231 acquires PSF information including slices captured at plural Z positions, previously stored in the parameter storage unit 241, in the capturing range of the observation information (Step S312).

Then, the first previous-capturing condition setting unit 231 acquires a capturing condition for the first previous capturing based on the exposure time Pex_n at the capturing start position acquired at Step S311 and the PSF information acquired at Step S312 (Step S313).

Figure 21:
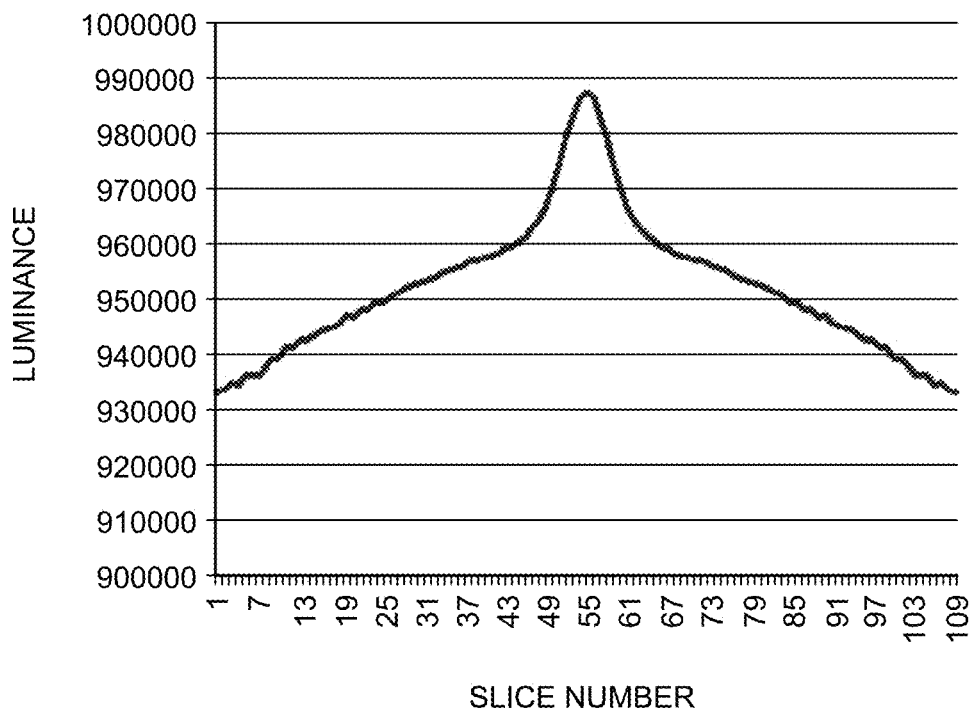
FIG. 21 is a graph that illustrates the luminance distribution information at each Z position, obtained from PSF information.

At Step S313, the first previous-capturing condition setting unit 231 acquires luminance distribution information at each Z position from the PSF information. FIG. 21 is a graph that illustrates the luminance distribution information at each Z position, obtained from the PSF information, specifically, an example of the relation between a slice (number) and luminance. The first previous-capturing condition setting unit 231 acquires luminance distribution information generated by plotting the sum of luminance at each slice, as illustrated in FIG. 21. In FIG. 21, for example, the slice on the near position side is No. 1, and the slice on the far side is No. 109.

After the luminance distribution information is acquired, the first previous-capturing condition setting unit 231 assumes that an image at the capturing start position (a still subject image acquired at the near position) is "the image captured by being located farthest from the focus position". Then, the first previous-capturing condition setting unit 231 determines a ratio between the luminance of the image captured by being located farthest from the focus position, i.e., the luminance of a slice 1, and the luminance at the focus position, e.g., luminance of a slice 55. When the ratio acquired here is gain K, the first previous-capturing condition setting unit 231 sets the exposure time Pex by using the following equation based on the exposure time Pex_n acquired at Step S301 and the above-described gain K.

K=the sum of luminance of the slice 1/the sum of luminance of the slice 55

$$Pex=Pex\_n \times K$$

Furthermore, the first previous-capturing condition setting unit 231 acquires the capturing range $D_1$ ($D_1$=near-far) from observation information and calculates the moving velocity Sp (Sp=$D_1$/Pex) based on the distance ($D_1$) and the exposure time Pex.

In this way, after the first previous-capturing condition setting unit 231 calculates the exposure time Pex and the moving velocity Sp that are capturing conditions for the first previous capturing, the control unit 51 returns to the flowchart of FIG. 18.

The processes from taking the previous image through acquiring the omnifocal image are the same as those at Step S202 to S205 according to the above-described modification of the first embodiment (Step S304 to S307). First, at Step S304, the control unit 51 conducts sweep capturing that is the first previous capturing so as to take the previous image in accordance with the exposure time Pex and the moving velocity Sp acquired at Step S303. At Step S305 subsequent to Step S304, the control unit 51 acquires the exposure time Rex and the moving velocity Sr that are capturing conditions for the primary capturing to acquire the primary image from the previous image. Then, the control unit 51 conducts sweep capturing in accordance with the exposure time Rex and the moving velocity Sr acquired at Step S305 to take the primary image (Step S306).

After the primary image is acquired, the control unit 51 restores the primary image by using a multifocal superimposition PSF image, thereby generating and acquiring an omnifocal image (Step S307). Then, the control unit 51 returns to FIG. 18 and terminates the process regarding image acquisition. The control unit 51 may display the acquired omnifocal image on the display device 30, store the omnifocal image in the storage unit 24, or display the omnifocal image on the display device 30 and also store the omnifocal image in the storage unit 24.

As described above, according to the second embodiment of the present disclosure, before the previous image is captured, automatic exposure processing is performed as the second previous capturing to acquire the exposure time Pex_n, the PSF information stored in the parameter storage unit 241 is acquired, and capturing conditions for the first previous capturing are set based on the exposure time Pex_n and the PSF information, whereby the exposure time for the first previous capturing may be properly set by previously conducting still image capturing only once. As compared with the case where the primary image is acquired by conducting only the first previous capturing without performing the second previous capturing as in the first embodiment, the primary (sweep) image may be captured by assuredly setting the optimum exposure time and a smaller number of times of capturing (capturing time). Furthermore, high-visibility omnifocal images with brightness saturation suppressed may be generated based on the primary (sweep) image and the multifocal superimposition PSF image. Thus, it is possible to acquire images with which the presence of a structure with depth is recognizable on a two-dimensional plane, which is the XY plane, while there is little discoloration of fluorescence from the subject.

In explanation according to the above-described second embodiment, the second previous-capturing condition setting unit 511 sets the near position in the capturing range as a capturing position and performs automatic exposure processing to acquire the exposure time Pex_n. However, the far position may be set as a capturing position to perform automatic exposure processing so as to acquire the exposure time Pex_f.

Modification 1 of the Second Embodiment

Figure 22:
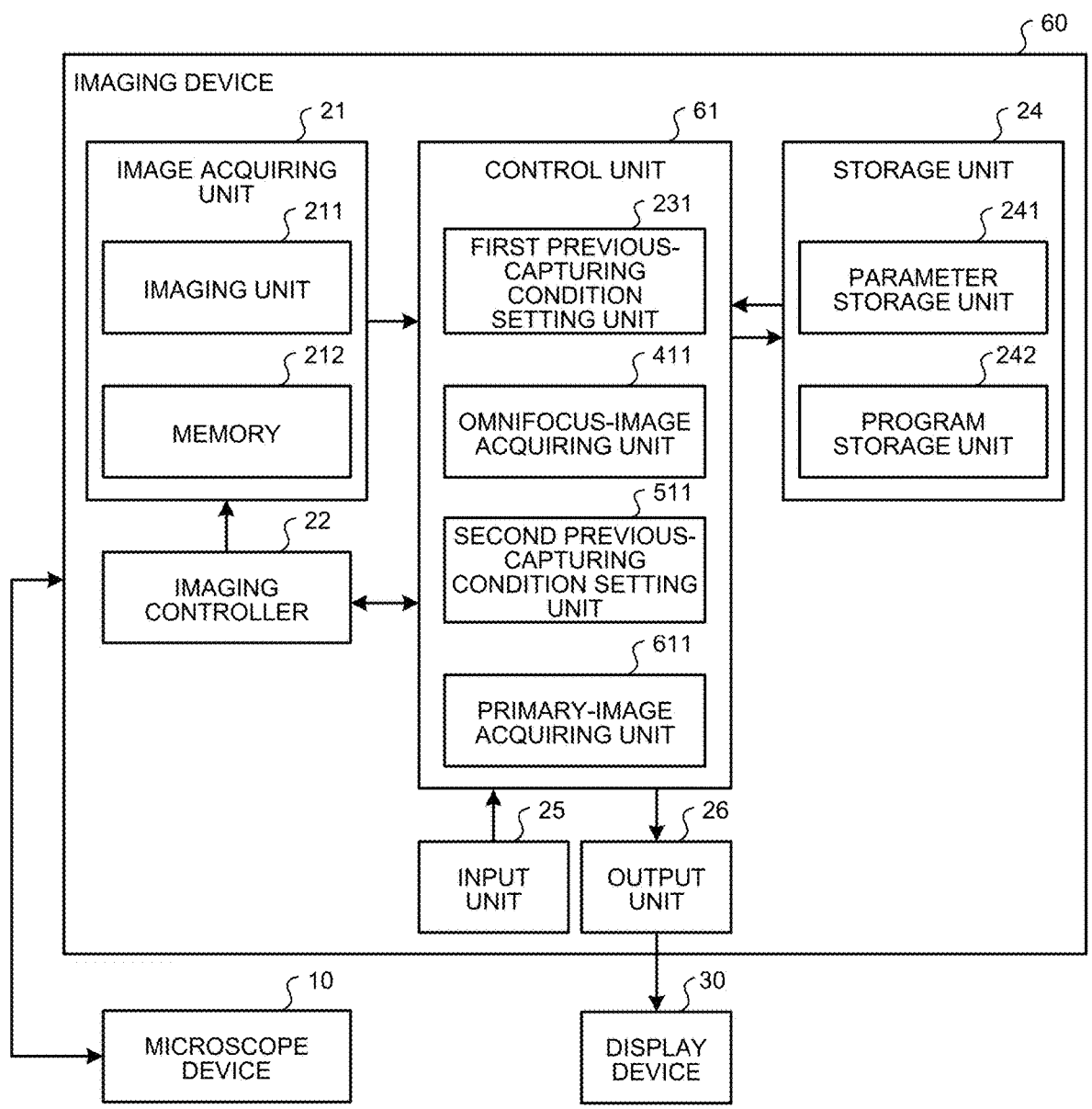
FIG. 22 is a block diagram that illustrates an example of the configuration of a microscopy system according to a modification 1 of the second embodiment of the present disclosure.

Next, a modification 1 of the second embodiment of the present disclosure is explained. FIG. 22 is a block diagram that illustrates an example of the configuration of a microscopy system according to the modification 1 of the second embodiment of the present disclosure. As illustrated in FIG. 22, a microscopy system 4 according to the modification 1 includes the microscope device 10; an imaging device 60 that acquires and processes images of the subject generated by the microscope device 10; and the display device 30 that displays images, or the like, processed by the imaging device 60. Among them, configurations and operations of the microscope device 10 and the display device 30 are the same as those in the first and the second embodiments.

Instead of the control unit 51 illustrated in FIG. 17, the imaging device 60 includes a control unit 61. As compared with the control unit 51, instead of the primary-capturing condition setting unit 232, the control unit 61 includes a primary-image acquiring unit 611 that generates the primary image based on the previous image. Here, operations of the first previous-capturing condition setting unit 231, the omnifocal image acquiring unit 411, and the second previous-capturing condition setting unit 511 are the same as those in the second embodiment. In the above-described second embodiment, capturing conditions for the primary capturing are acquired on the basis of the previous image, and then the primary capturing is conducted to acquire the primary image. However, according to the modification 1, the primary image is generated based on the previous image.

Figure 23:
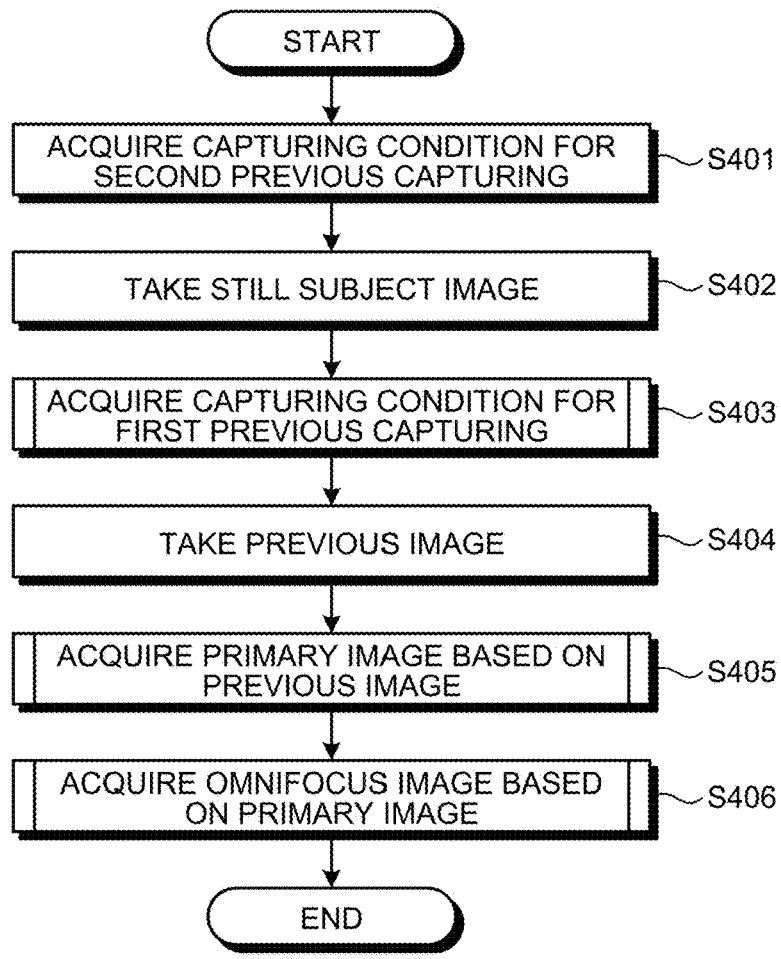
FIG. 23 is a flowchart that illustrates operation of the microscopy system illustrated in FIG. 22.

Next, operations of the microscopy system 4 according to the modification 1 are explained. FIG. 23 is a flowchart that illustrates operation of the microscopy system 4. An explanation is given based on the assumption that each unit performs the operation described below under the control of the control unit 61.

The process to set the capturing conditions for the second previous capturing until the process to take the previous image are the same as those at Step S301 to S304 in FIG. 18 described above (Step S401 to S404). The second previous-capturing condition setting unit 511 acquires a capturing condition for the second previous capturing (Step S401). Then, the control unit 61 takes a still subject image in accordance with the capturing condition acquired at Step S401 (Step S402). At Step S403 subsequent to Step S402, the first previous-capturing condition setting unit 231 acquires a capturing condition for the first previous capturing. The first previous-capturing condition setting unit 231 acquires the capturing conditions (the exposure time Pex and the moving velocity Sp) for the first previous capturing on the basis of the exposure time Pex_n acquired at Step S401, specifically, by using the luminance of the still subject image acquired at Step S402. At Step S404 subsequent to Step S403, the control unit 61 conducts sweep capturing in accordance with the exposure time Pex and the moving velocity Sp acquired at Step S403 to take the previous image.

Figure 24:
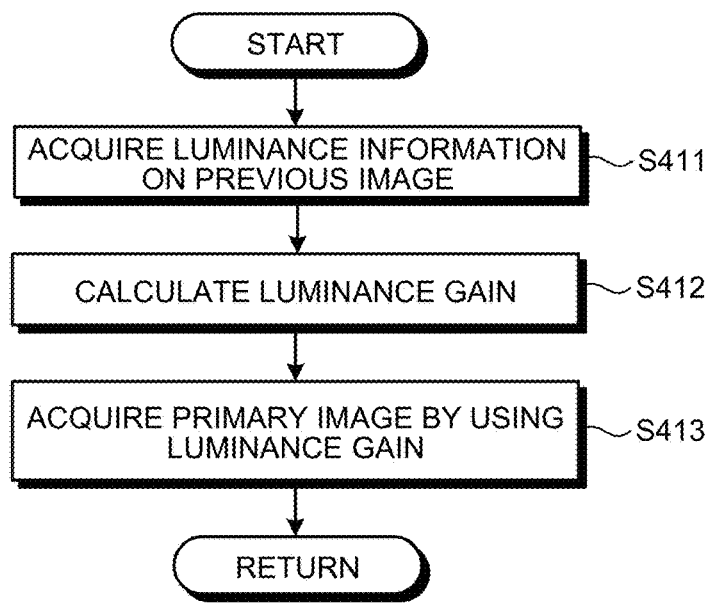
FIG. 24 is a flowchart that illustrates the process to acquire the primary image illustrated in FIG. 23.

At Step S405 subsequent to Step S404, the primary-image acquiring unit 611 generates and acquires the primary image based on the previous image acquired at Step S404. FIG. 24 is a flowchart that illustrates the process to acquire the primary image illustrated in FIG. 23. First, the primary-image acquiring unit 611 acquires luminance information on the previous image (Step S411). The primary-image acquiring unit 611 generates a histogram as luminance information on the previous image.

Figure 25:
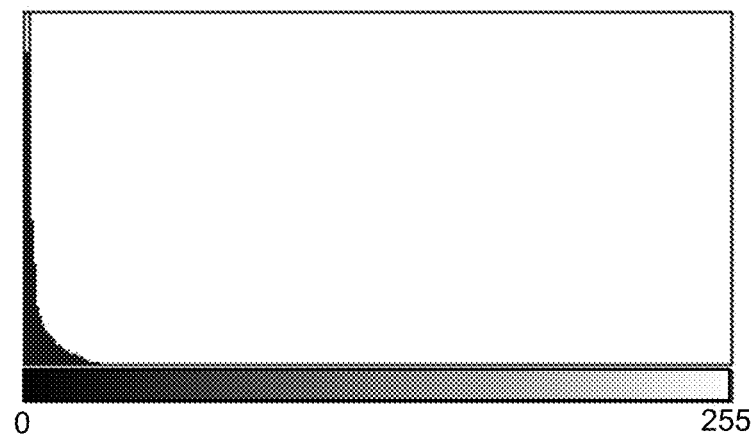
FIG. 25 is a diagram that illustrates an example of the histogram generated based on the previous image.

FIG. 25 is a graph that illustrates an example of the histogram generated based on the previous image. As illustrated in FIG. 25, the minimum luminance value (Min), the maximum luminance value (Max), and the mean (Mean) may be acquired from the histogram generated on the basis of luminance values of the previous image.

Figure 26:
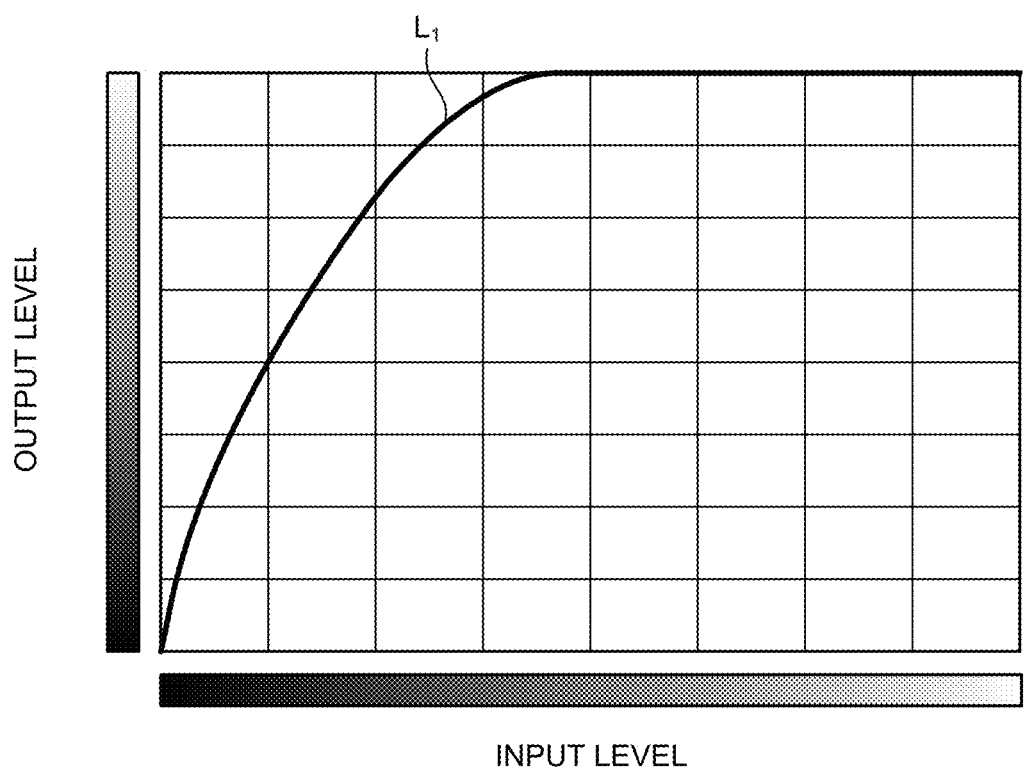
FIG. 26 is a graph that illustrates a tone curve for calculating luminance gain from the previous image.

After luminance information on the previous image is acquired, the primary-image acquiring unit 611 uses a known gain adjustment method to calculate luminance gain from the previous image (Step S412). FIG. 26 is a graph that illustrates a tone curve for calculating luminance gain from the previous image. The primary-image acquiring unit 611 conducts gain adjustment on the basis of the relation between an input level and an output level by using a tone curve $L_1$ that is set based on luminance information and illustrated in, for example, FIG. 26, thereby acquiring luminance gain at each tone. Furthermore, the primary-image acquiring unit 611 may acquire luminance gain by using an automatic adjustment algorithm for luminance or contrast.

Figure 27:
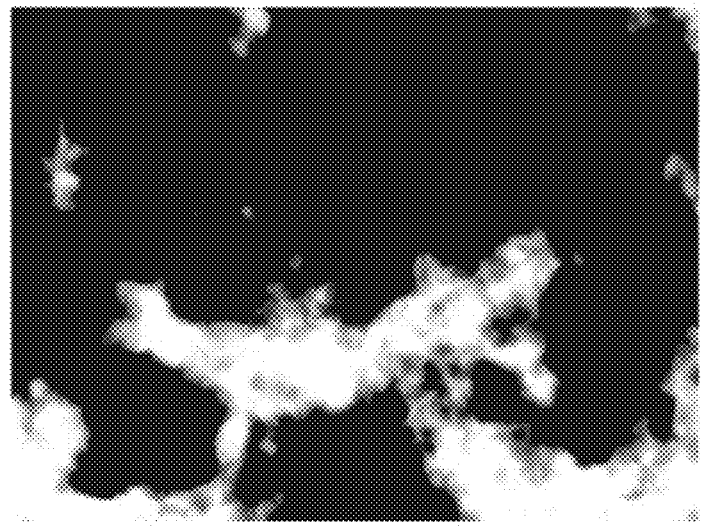
FIG. 27 is a diagram that illustrates an example of the primary image obtained by gain adjustment on the previous image.

After the luminance gain is calculated, the primary-image acquiring unit 611 uses the luminance gain to conduct gain adjustment on the previous image, thereby generating and acquiring the primary image (Step S413). FIG. 27 illustrates an example of the primary image obtained by gain adjustment on the previous image. Gain adjustment is conducted on the previous image (for example, see FIG. 9) in accordance with the luminance gain acquired at Step S412 so that the primary image illustrated in, for example, FIG. 27 may be obtained.

After the primary image is acquired, the control unit 61 returns to the flowchart of FIG. 23 and restores the primary image by using the multifocal superimposition PSF image, thereby generating and acquiring an omnifocal image in the same manner as the above-described Step S307 in FIG. 18 (Step S406). Then, the control unit 61 terminates the process regarding image acquisition. The control unit 61 may display the acquired omnifocal image on the display device 30, store the omnifocal image in the storage unit 24, or display the omnifocal image on the display device 30 and also store the omnifocal image in the storage unit 24.

As described above, according to the modification 1, luminance gain is calculated from the previous image, and the primary image is generated based on the luminance gain. Therefore, still image capturing and sweep capturing are previously conducted only once to set the optimum exposure time with a small number of times of capturing (capturing time) and the primary image may be generated based on the previous image acquired with the optimum exposure time. Furthermore, the high-visibility omnifocal image with brightness saturation suppressed may be generated on the basis of the primary image and the multifocal superimposition PSF image. Thus, it is possible to acquire an image with which the presence of a structure with depth is recognizable on a two-dimensional plane, which is the XY plane, while there is little discoloration of fluorescence from the subject.

Modification 2 of the Second Embodiment

Figure 28:
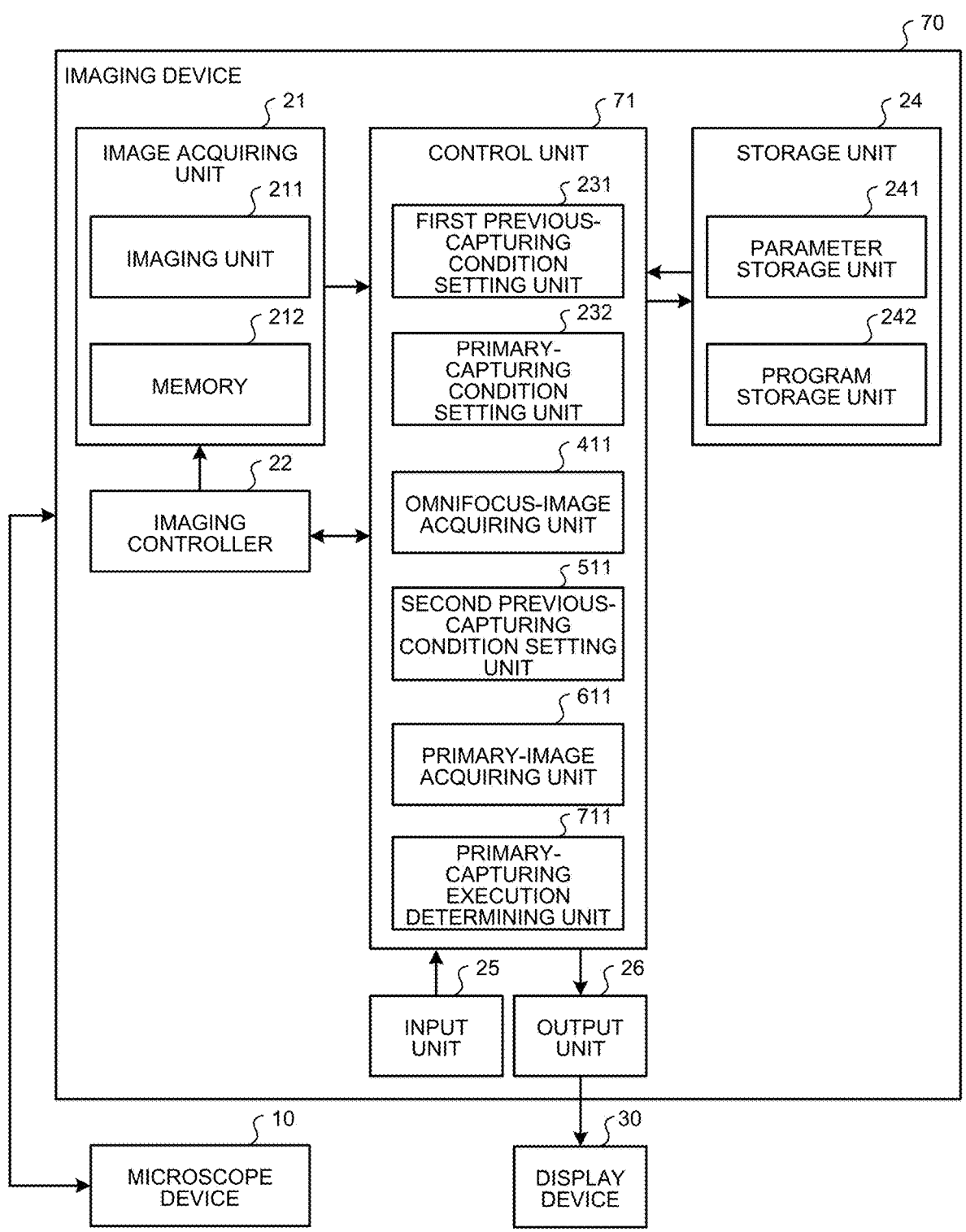
FIG. 28 is a block diagram that illustrates an example of the configuration of a microscopy system according to a modification 2 of the second embodiment of the present disclosure.

Next, a modification 2 of the second embodiment of the present disclosure is explained. FIG. 28 is a block diagram that illustrates an example of the configuration of a microscopy system according to the modification 2 of the second embodiment of the present disclosure. As illustrated in FIG. 28, a microscopy system 5 according to the modification 2 includes the microscope device 10; an imaging device 70 that acquires and processes images of the subject generated by the microscope device 10; and the display device 30 that displays images, or the like, processed by the imaging device 70. Among them, configurations and operations of the microscope device 10 and the display device 30 are the same as those in the first and the second embodiments.

Instead of the control unit 61 illustrated in FIG. 22, the imaging device 70 includes a control unit 71. As compared with the control unit 61, the control unit 71 further includes a primary-capturing execution determining unit 711 that determines whether the primary capturing is executed on the basis of the primary image generated based on the previous image; and the above-described primary-capturing condition setting unit 232. Here, operations of the first previous-capturing condition setting unit 231, the omnifocal image acquiring unit 411, the second previous-capturing condition setting unit 511, and the primary-image acquiring unit 611 are the same as those in the modification 1 of the second embodiment. In the above-described modification 1 of the second embodiment, the primary image is acquired based on the previous image. However, according to the modification 2, the primary capturing is conducted on the basis of the information on the primary image generated based on the previous image, and it is determined whether a primary image is to be acquired during sweep capturing.

Figure 29:
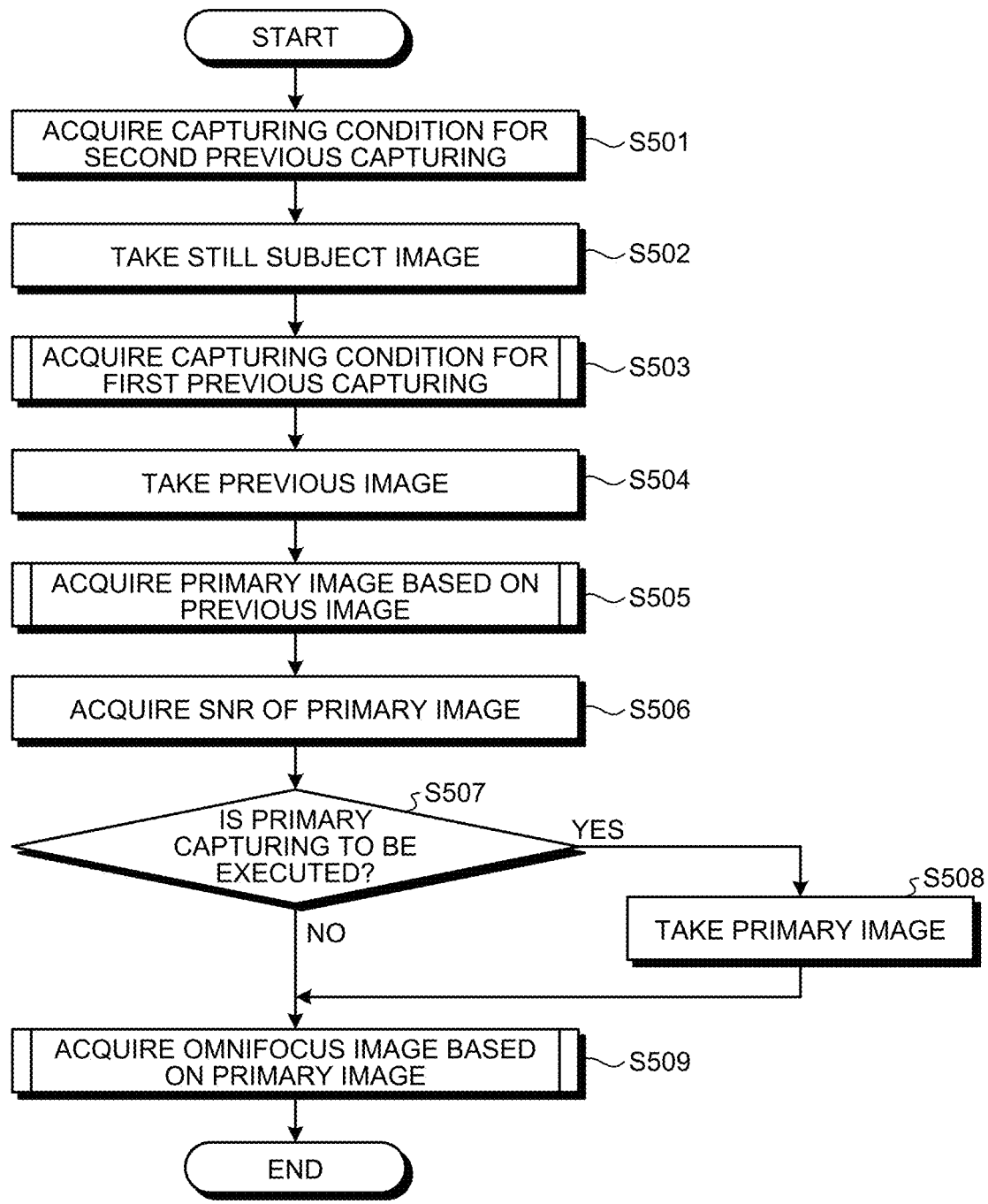
FIG. 29 is a flowchart that illustrates operation of the microscopy system illustrated in FIG. 28.

Next, operation of the microscopy system 5 according to the modification 2 is explained. FIG. 29 is a flowchart that illustrates operation of the microscopy system 5. An explanation is given based on the assumption that each unit performs the operation described below under the control of the control unit 71.

The process to set the capturing condition for the second previous capturing until the process to acquire the primary image based on the previous image are the same as those at the above-described Step S401 to S405 in FIG. 23 (Steps S501 to S505). The second previous-capturing condition setting unit 511 acquires a capturing condition for the second previous capturing (Step S501). Then, the control unit 71 takes a still subject image in accordance with the capturing condition acquired at Step S501 (Step S502). At Step S503 subsequent to Step S502, the first previous-capturing condition setting unit 231 acquires a capturing condition for the first previous capturing. The first previous-capturing condition setting unit 231 acquires capturing conditions (the exposure time Pex and the moving velocity Sp) for the previous image on the basis of the exposure time Pex_n acquired at Step S501. At Step S504 subsequent to Step S503, the control unit 51 conducts sweep capturing in accordance with the exposure time Pex and the moving velocity Sp acquired at Step S503 to take the previous image.

At Step S505 subsequent to Step S504, the primary-image acquiring unit 611 calculates luminance gain from the previous image acquired at Step S504 and generates and acquires the primary image based on the luminance gain (Step S505).

After the primary-image acquiring unit 611 generates the primary image based on the previous image, the primary-capturing execution determining unit 711 acquires a signal-noise ratio (SNR) at any area of the primary image so as to determine whether the primary sweep capturing is conducted to newly acquire a primary image (Step S506). Here, the primary-capturing execution determining unit 711 may divide an image into plural areas and determine the average SNR of the entire image based on the SNR of each area.

The primary-capturing execution determining unit 711 determines whether the primary capturing is to be executed to newly acquire a primary image (Step S507). The primary-capturing execution determining unit 711 compares the SNR acquired at Step S506 with a threshold. When the SNR is larger than the threshold, it is determined that the primary capturing is not to be executed (Step S507: No) and proceeds to Step S509. Conversely, when the SNR is equal to or less than the threshold, there is a higher proportion of noise than signals in the image, and therefore the primary-capturing execution determining unit 711 determines that the primary capturing is to be executed to acquire the primary image again (Step S507: Yes) and proceeds to Step S508. Incidentally, when it is determined that the primary capturing is not to be executed (Step S507: No), the control unit 71 may perform image processing such as noise reduction processing on the primary image based on the previous image.

At Step S508, the control unit 71 acquires capturing conditions (the exposure time Rex and the moving velocity Sr) for the primary capturing from the previous image and conducts sweep capturing in accordance with the exposure time Rex and the moving velocity Sr acquired, thereby to take the primary image. For example, in accordance with the above-described flow of FIG. 10, the primary-capturing condition setting unit 232 acquires the exposure time Rex and the moving velocity Sr and conducts sweep capturing in accordance with the exposure time Rex and the moving velocity Sr acquired, thereby to acquire the primary image.

Then, the control unit 71 uses the primary image acquired at Step S505 or the primary image acquired at Step S508 to restore the primary image with a multifocal superimposition PSF image, thereby generating and acquiring an omnifocal image in the same manner as the above-described Step S406 in FIG. 23 (Step S509). Then, the control unit 71 terminates the process regarding image acquisition. The control unit 71 may display the acquired omnifocal image on the display device 30, store the omnifocal image in the storage unit 24, or display the omnifocal image on the display device 30 and also store the omnifocal image in the storage unit 24.

As described above, according to the modification 2, it is determined whether the primary capturing needs to be executed on the basis of the primary image generated based on the previous image, and the primary (sweep) image is newly acquired in accordance with a determination result. Therefore, a user is provided with a choice between a case where the primary image is acquired during single sweep capturing in order to prevent discoloration of the subject due to exposure to the illumination light even if there are much noise as in the primary image generated based on the previous image, or a case where image quality is regard as more important than the number of times of capturing by executing capturing again in accordance with the image quality of the primary image generated by conducting gain adjustment on the previous image. Accordingly, subject images desired by users may be provided.

Furthermore, according to the second embodiment and the modifications 1 and 2 described above, omnifocal images are generated based on primary images. However, a control unit may acquire the primary image acquired during the primary capturing or the primary image generated based on the previous image as a final image without generating omnifocal images. Furthermore, according to the second embodiment and the modifications 1 and 2 described above, the second previous capturing is performed to set capturing conditions for the first previous capturing. However, as in the first embodiment, only the first previous capturing may be performed to acquire the primary image.

The first and the second embodiments and the modifications described above are not limited to the way they are, and various embodiments may be implemented by appropriately combining components disclosed in each of the embodiments and the modifications. For example, they may be implemented by eliminating some components from all the components disclosed in the embodiment. Alternatively, they may be implemented by appropriately combining components disclosed in different embodiments.

Furthermore, according to the first and the second embodiments and the modifications described above, the first previous-capturing condition setting unit 231, the primary-capturing condition setting unit 232, the omnifocal image acquiring unit 411, the second previous-capturing condition setting unit 511, the primary-image acquiring unit 611, and the primary-capturing execution determining unit 711 are provided in a control unit. However, each unit may be provided as a different block from the control unit.

According to the present disclosure, there is an advantage such that when sweep capturing is conducted for luminescent observation using a microscope, high-visibility images may be acquired.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscopy system comprising:
  an imaging apparatus that captures an image of a subject through a microscopy optical system of a microscope and generates a subject image; and
  a processor comprising hardware, the processor being configured to
    set a capturing condition of the imaging apparatus, and
    control the imaging apparatus based on the capturing condition, thereby to cause the imaging apparatus to capture an image of the subject;
  wherein
  the processor is further configured to
    set a first capturing condition for first previous capturing to capture a previous image for generating a primary image of the subject, as the capturing condition of the imaging apparatus, the first previous capturing being sweep capturing that is capturing while changing a position of a focal plane with respect to the subject, such that brightness saturation does not occur in the previous image obtained during the sweep capturing, and
    capture the primary image based on the previous image,
  wherein
  the processor is further configured to
    set a second capturing condition for primary capturing to capture the primary image, as the capturing condition of the imaging apparatus, the primary capturing being sweep capturing that is capturing while changing a position of a focal plane with respect to the subject, based on the previous image captured during the first previous capturing, and
    cause the imaging apparatus to capture the image of the subject in accordance with the second capturing condition for the primary capturing.

2. The microscopy system according to claim 1, wherein the processor is further configured to generate the primary image based on the previous image.

3. The microscopy system according to claim 1, wherein the processor is further configured to
  determine whether capturing the primary image by sweep capturing is to be executed in accordance with the primary image generated based on the previous image, and
  set the second capturing condition for the primary image as the capturing condition of the imaging apparatus, when it is determined that the capturing of the primary image by the sweep capturing is to be executed.

4. The microscopy system according to claim 1, wherein the processor is further configured to acquire an omnifocal image based on the primary image and blur information on the primary image.

5. The microscopy system according to claim 4, wherein the blur information includes information generated by using a point spread function representing blur of the primary image in a capturing range of the sweep capturing.

6. The microscopy system according to claim 1, wherein the processor is further configure to
  set a third capturing condition for second previous capturing that is conducted before the first previous capturing, the second previous capturing being still image capturing for capturing a still subject image at a capturing start position or a capturing end position in a capturing range of the sweep capturing,
  set the third capturing condition for the second previous capturing thereby to acquire an exposure time of the still subject image, and
  set the first capturing condition for the first previous capturing based on the exposure time obtained during the second previous capturing.

7. The microscopy system according to claim 1, wherein the first capturing condition preventing the brightness saturation includes an exposure time for conducting the sweep capturing.

8. A microscopy method comprising:
  setting a first capturing condition for previous capturing to generate a previous image for generating a primary image based on a subject, the previous capturing being sweep capturing that is capturing while changing a position of a focal plane with respect to the subject, such that brightness saturation does not occur in the previous image obtained during the sweep capturing;
  causing an imaging apparatus to capture the previous image in accordance with the first capturing condition for the previous capturing set at the setting;
  setting a second capturing condition for primary capturing to generate the primary image on the basis of the previous image captured through the previous capturing by the imaging apparatus, the primary capturing being sweep capturing that is capturing while changing the position of the focal plane with respect to the subject; and
  causing the imaging apparatus to capture the primary image in accordance with the second capturing condition that has been set in the setting the second capturing condition.

9. A non-transitory computer-readable storage medium storing a microscopy program causing a computer to execute:
  setting a first capturing condition for previous capturing to generate a previous image for generating a primary image based on a subject, the previous capturing being sweep capturing that is capturing while changing a position of a focal plane with respect to the subject, such that brightness saturation does not occur in the previous image obtained during the sweep capturing;
  causing an imaging apparatus to capture the previous image in accordance with the first capturing condition for the previous capturing set at the setting;
  setting a second capturing condition for primary capturing to generate the primary image on the basis of the previous image captured through the previous capturing by the imaging apparatus, the primary capturing being sweep capturing that is capturing while changing the position of the focal plane with respect to the subject; and
  causing the imaging apparatus to capture the primary image in accordance with the second capturing condition that has been set in the setting the second capturing condition.

* * * * *